United States Patent
Ujiie et al.

(10) Patent No.: US 9,596,145 B2
(45) Date of Patent: Mar. 14, 2017

(54) COMMUNICATION SYSTEM, GUI APPARATUS, AND SERVICE APPARATUS

(75) Inventors: Junya Ujiie, Tokyo (JP); Jumpei Hato, Tokyo (JP); Mikio Sasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 322 days.

(21) Appl. No.: 14/374,001

(22) PCT Filed: Jul. 2, 2012

(86) PCT No.: PCT/JP2012/066863
§ 371 (c)(1),
(2), (4) Date: Jul. 23, 2014

(87) PCT Pub. No.: WO2014/006669
PCT Pub. Date: Jan. 9, 2014

(65) Prior Publication Data
US 2014/0351703 A1    Nov. 27, 2014

(51) Int. Cl.
*G06F 9/54* (2006.01)
*H04L 12/24* (2006.01)
*G06F 3/0481* (2013.01)

(52) U.S. Cl.
CPC ............ *H04L 41/22* (2013.01); *G06F 3/0481* (2013.01); *G06F 9/542* (2013.01)

(58) Field of Classification Search
CPC ......... G06F 9/542; G06F 3/0481; H04L 41/22
See application file for complete search history.

(56) References Cited

U.S. PATENT DOCUMENTS

| | | | | |
|---|---|---|---|---|
| 7,207,008 | B1 * | 4/2007 | Koch | G06F 9/542 705/34 |
| 2003/0009602 | A1 | 1/2003 | Jacobs et al. | |
| 2004/0064530 | A1 | 4/2004 | Sinclair et al. | |
| 2004/0216134 | A1 * | 10/2004 | Hammerich | G06F 9/542 719/318 |
| 2006/0224699 | A1 * | 10/2006 | Kruse | H04L 29/06 709/219 |
| 2009/0083752 | A1 | 3/2009 | Wu et al. | |
| 2012/0028660 | A1 * | 2/2012 | Stafford | H04W 4/12 455/466 |

FOREIGN PATENT DOCUMENTS

JP    1 291333    11/1989
JP    03 040040    2/1991
(Continued)

OTHER PUBLICATIONS

International Search Report Issued Sep. 4, 2012 in PCT/JP12/066863 filed Jul. 2, 2012.

*Primary Examiner* — Syed Roni
(74) *Attorney, Agent, or Firm* — Oblon, McClelland, Maier & Neustadt, L.L.P.

(57) ABSTRACT

An event list required by a graphical user interface (GUI) apparatus is notified to a service apparatus. The service apparatus assigns an ID to an event list and responds to the GUI apparatus. In a case where an event occurs in the service apparatus, the service apparatus determines based on an event list from the GUI apparatus whether to perform an event notification. When notifying an event to the service apparatus, the GUI apparatus transmits an ID in place of an event list in a case where the ID exists.

12 Claims, 20 Drawing Sheets

(56) References Cited

FOREIGN PATENT DOCUMENTS

| | | |
|---|---|---|
| JP | 07 044495 | 2/1995 |
| JP | 2000 207372 | 7/2000 |
| JP | 2004 145851 | 5/2004 |
| JP | 2004 532479 | 10/2004 |
| JP | 2008 077219 | 4/2008 |
| JP | 2008 146480 | 6/2008 |
| JP | 2009 075808 | 4/2009 |

* cited by examiner

COMMUNICATION SYSTEM, GUI APPARATUS, AND SERVICE APPARATUS

TECHNICAL FIELD

The present invention relates to a communication system in which a GUI apparatus and a service apparatus are connected with each other through a network to perform mutual communication such that graphics are displayed at the GUI apparatus.

BACKGROUND ART

In a conventional embedded device having a GUI (Graphical User Interface), service logic defining the behavior of applications and the GUI are typically implemented on the same device so as to be configured as an apparatus capable of independent actions on its own.

Meanwhile, there is another method of constructing a system, such as a server-client system, in which service logic is equipped in a server and a GUI is equipped in a client to collaborate with each other via a network.

By the recent improvement in processing ability of embedded devices and popularization of having a network connection function, the server-client system mentioned above has become applicable to embedded devices, such that a GUI and service logic are implemented on separate devices.

In such a system, communication between the GUI and the service logic, which has been performed within the same device, is replaced by communication between devices. The processing ability of inter-device communication is generally lower than the processing ability of communication within the same device. Further in conventional systems, any event occurring in the service logic is notified to the GUI. The GUI makes a decision whether to use the received events and reflects the result on the GUI. Replacement of communication within the device by inter-device communication results in prolonged time for communication, which follows that the responsive performance of the overall system, for example, the time to be taken from a user's operation of the GUI until the service logic's processing in response to the operation to reflect the processing result on the GUI, is desirably improved by reducing the amount and frequency of inter-device communication. Specifically, unnecessary events are desirably not notified from the service logic to the GUI.

For example, Patent Literature 1 describes that a destination that has requested event notification is registered as a listener, and events are notified to the registered listener, in order to avoid occurrence of unnecessary notification of events. Patent Literature 2 describes that even when an informer program generates events, only an event which has been presented to a notification manager is notified, in order to avoid occurrence of unnecessary notification of events. In so doing, a communication parameter and a dictionary corresponding thereto are used to reduce the amount of communication for specifying one or more events to be presented to the notification manager.

CITATION LIST

Patent Literature 1: Japanese Patent Application Laid-Open No. 2008-077219
Patent Literature 2: Japanese Translation of PCT International Application Publication No. 2004-532479

SUMMARY OF INVENTION

However, in the technology as described in Patent Literature 1, reception of one event entails another request for event notification to receive the next event. Thus, when the approach of Patent Literature 1 is applied to a system in which the GUI and service logic are implemented on different devices, communication is performed frequently.

In the configuration described in Patent Literature 2, the correlation between the notification parameter for the notification manager and the dictionary is fixed. The approach of Patent Literature 2 is safely applicable to a system involving fewer kinds of events, however, a system involving a number of kinds of events leads to an increased size of dictionary. Moreover, considering a case in which the service logic is unchanged and the GUI is changed, the change to the GUI could involve change in pattern of events for use in the GUI. In this case, according to the approach of Patent Literature 2, the GUI is not changeable unless the changed patterns are listed in the dictionary.

This invention has been made to solve the foregoing problems by providing a communication system which is capable of reducing amount of communication and dealing with flexible change in pattern of events.

A communication system according to this invention includes: a GUI apparatus that performs screen construction based on an event notification; and a service apparatus that executes a service and generates an event, the GUI apparatus and the service apparatus being connected with each other through a network to perform mutual communication, wherein the GUI apparatus includes: a GUI apparatus-side event list memory that stores an event list and an ID for uniquely identifying the event list, the event list being a list of the event; and a GUI apparatus-side event processor that transmits to the service apparatus the event list to be used in a screen at the time of screen construction, and that, prior to the transmission, refers to the GUI apparatus-side event list memory and, in a case where the event list matching the event list to be transmitted exists, obtains the ID for uniquely identifying the event list to transmit to the service apparatus the ID in place of the event list to be transmitted, the GUI apparatus-side event processor causing the GUI apparatus-side event list memory to store, in a case where the ID is contained in a response message resulting from the transmission of the event list or the ID to the service apparatus, the ID contained in the response message and the event list transmitted to the service apparatus or the event list whose ID is sent instead, as one combination, wherein the service apparatus includes: a service apparatus-side event list memory that stores the event list and the ID for uniquely identifying the event list, the event list being a list of the event; an ID manager that manages a relation between the event list and the ID; a service processor that executes the service to generate the event; and an event processor that, when the event list is received from the GUI apparatus, refers to the service apparatus-side event list memory; in a case where the event list matching the received event list exists, obtains the ID for uniquely identifying the event list to include the ID in the response message to the GUI apparatus and transmit the response message; and in a case where the event list matching the received event list is absent as a result of referring to the service apparatus-side event list memory, obtains from the ID manager an ID unregistered with the service apparatus-side event list memory to register with the service apparatus-side event list memory the obtained ID and the received event list as one combination, and includes the obtained ID in the response message to the GUI apparatus and transmits the response message, and that, when the ID is received from the GUI apparatus, refers to the service apparatus-side event list memory to, in a case where the event list matching the received ID exists, include the received ID in the response message to the GUI apparatus and transmit the response message, and wherein the service apparatus-side event processor makes a determination on the event to be generated based on the service of the service processor as to whether the event list containing the event is to be notified to the GUI apparatus, and notifies the GUI apparatus of the event only in a case where the event list is to be notified.

The communication system according to the present invention is configured to notify the service apparatus of an event list for use in the GUI apparatus. The service apparatus is configured to determine whether to notify the GUI apparatus of an event based on the notified event list, and configured to assign identification (ID) to the event list to respond to the GUI apparatus. The GUI apparatus is configured to transmit the ID in place of the event list in a case where the ID exists. Therefore, reduction in amount of communication and flexible change in pattern of events are achieved.

DESCRIPTION OF EMBODIMENTS

Embodiments of the invention are described with reference to the accompanying drawings to provide a more detailed description of this invention.

(Embodiment 1)

Figure 1:
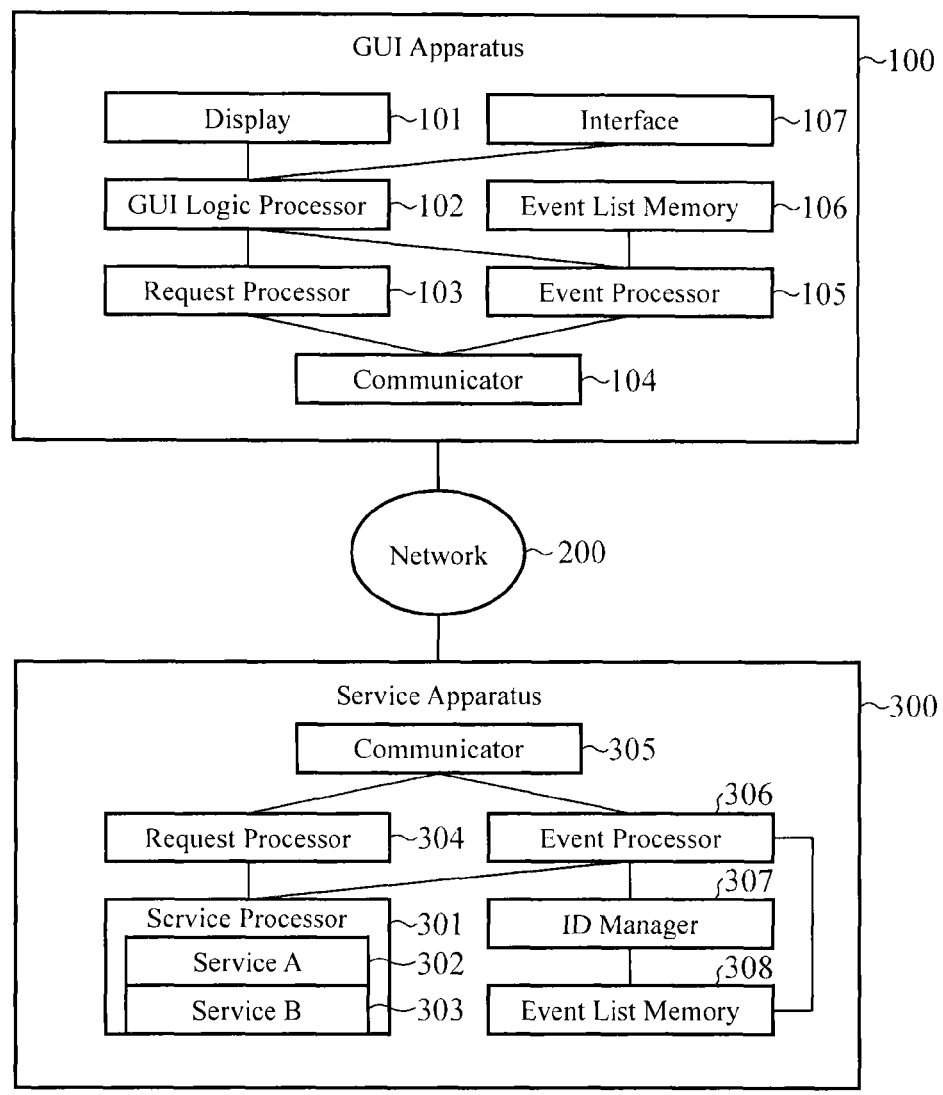
FIG. 1 is a configuration diagram depicting a communication system according to Embodiment I of the present invention.

FIG. 1 is a configuration diagram depicting a communication system according to Embodiment 1 of the invention.

The communication system depicted in FIG. 1 has a configuration in which a GUI apparatus 100 and a service apparatus 300 are connected with each other through a network 200.

The GUI apparatus 100 includes a display 101, a GUI logic processor 102, a request processor 103, a communicator 104, an event processor (a GUI apparatus-side event processor) 105, an event list memory (a GUI apparatus-side event list memory) 106, and an interface 107.

The display 101 is a device, such as a liquid crystal display, configured to display a GUI. The GUI logic processor 102 is a device that is configured to construct the GUI to be displayed on the display 101, and configured to input and output with the interface 107. The GUI logic processor 102 is also configured to issue a request through the request processor 103 to the service apparatus 300, configured to change the GUI to be displayed on the display 101 based on an event notified from the event processor 105, and configured to execute output other than the GUI through the interface 107. The request processor 103 is a device configured to execute conversion to adapt a request to the service apparatus 300, which has been received from the GUI logic processor 102, to communication through the communicator 104. For example, in a case where the GUI logic processor 102 makes a function call to the request processor 103 and the GUI apparatus 100 and the service apparatus 300 perform communication with a HTTP (Hyper Text Transfer Protocol) (where the GUI apparatus 100 is a client and the service apparatus 300 is a server), the above-mentioned conversion corresponds to conversion of the function call from the GUI logic processor 102 into an HTTP request.

The communicator 104 is a device configured to execute data transmission and reception through the network 200 with the service apparatus 300. The event processor 105 is a device configured to execute a process relating to events in the GUI apparatus 100, e.g., registration of an event list with the service apparatus 300 and delivery of an event received from the service apparatus 300 to the GUI logic processor 102. The detail of the event list is described later. The event list memory 106 is a device for storing a combination of the event list which the event processor 105 registers with the service apparatus 300 and an ID utilized for uniquely identifying the event list. The interface 107 is a device oriented to interact with a system user, and the examples thereof include a touch panel and a speaker.

The service apparatus 300 includes a service processor 301, a request processor 304, a communicator 305, an event processor (a service apparatus-side event processor) 306, an ID manager 307, and an event list memory (a service apparatus-side event list memory) 308.

The service processor 301 includes one or more services. FIG. 1 depicts an example including two services, i.e., a service A 302 and a service B 303. The service denotes a program for providing a function unique thereto. The request processor 304 is a device configured to execute conversion to adapt a request received from the GUI apparatus 100 to the service processor 301. For example, in a case where the GUI apparatus 100 and the service apparatus 300 perform communication with the HTTP and the service processor 301 has public APIs (Application Programming Interfaces) defined by the services, the above-mentioned conversion corresponds to analyzing the HTTP request to identify a corresponding API and calling the identified API. The communicator 305 is a device configured to execute data transmission and reception through the network 200 with the GUI apparatus 100.

The event processor 306 is a device configured to execute a process relating to events in the service apparatus 300, e.g., event list registration requested by the GUI apparatus 100 and reception of a generated event from the service processor 301 to make a decision whether or not to notify the GUI apparatus 100 of the event. The ID manager 307 is a device for deciding an ID for uniquely identifying the event list transmitted from the GUI apparatus 100. The ID manager 307 is also configured to have a function of referring to the contents stored on the event list memory 308 to identify an event list that corresponds to the ID designated by the event processor 306. The event list memory 308 is a device for storing a combination of an event list transmitted from the GUI apparatus 100 and an ID for uniquely identifying the event list.

Figure 2:
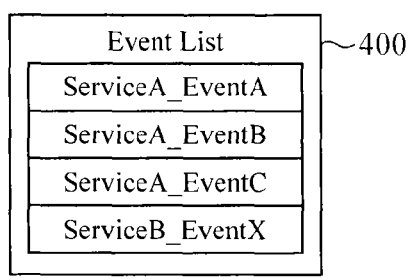
FIG. 2 is an explanatory diagram depicting an event list for the communication system according to the Embodiment 1 of the present invention.

FIG. 2 depicts a configuration of an event list 400 according to this embodiment. The event list 400 includes zero or more names of events. In this embodiment, it is set such that events are uniquely identifiable within the system by the names of the events. It is to be noted that the end of the event list 400 is recognizable by an element signifying the number of elements or a terminal end, which is omitted in FIG. 2.

Figure 3:
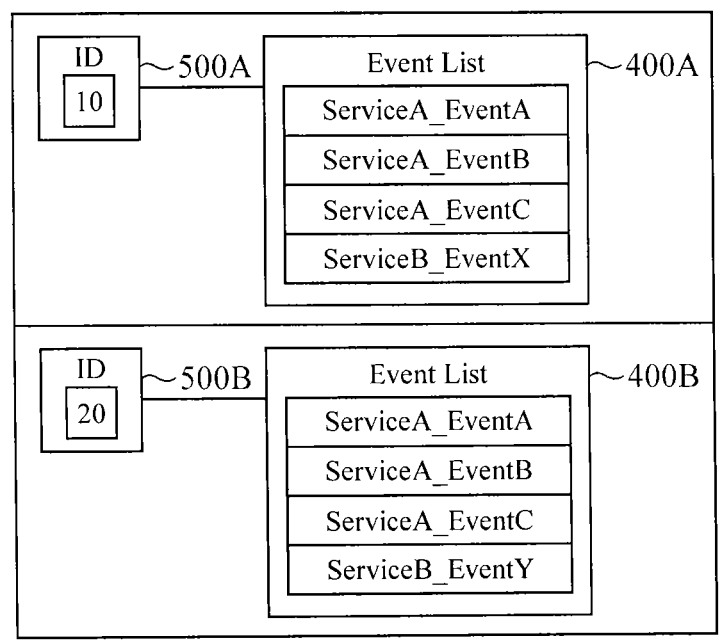
FIG. 3 is an explanatory diagram depicting contents to be stored by an event list memory of the communication system according to the Embodiment 1 of the present invention.

FIG. 3 depicts the contents to be stored by the event list memory 106 and the event list memory 308 according to this embodiment. The contents to be stored have a combination of an ID and an event list (i.e. an event list 400A and an ID 500A; an event list 400B and an ID 500B) as one element. In FIG. 3, two elements are stored.

Next, operations of the GUI apparatus 100 and the service apparatus 300 are described with referring to FIGS. 1, 2, 3, 4, 5, and 6.

Figure 4:
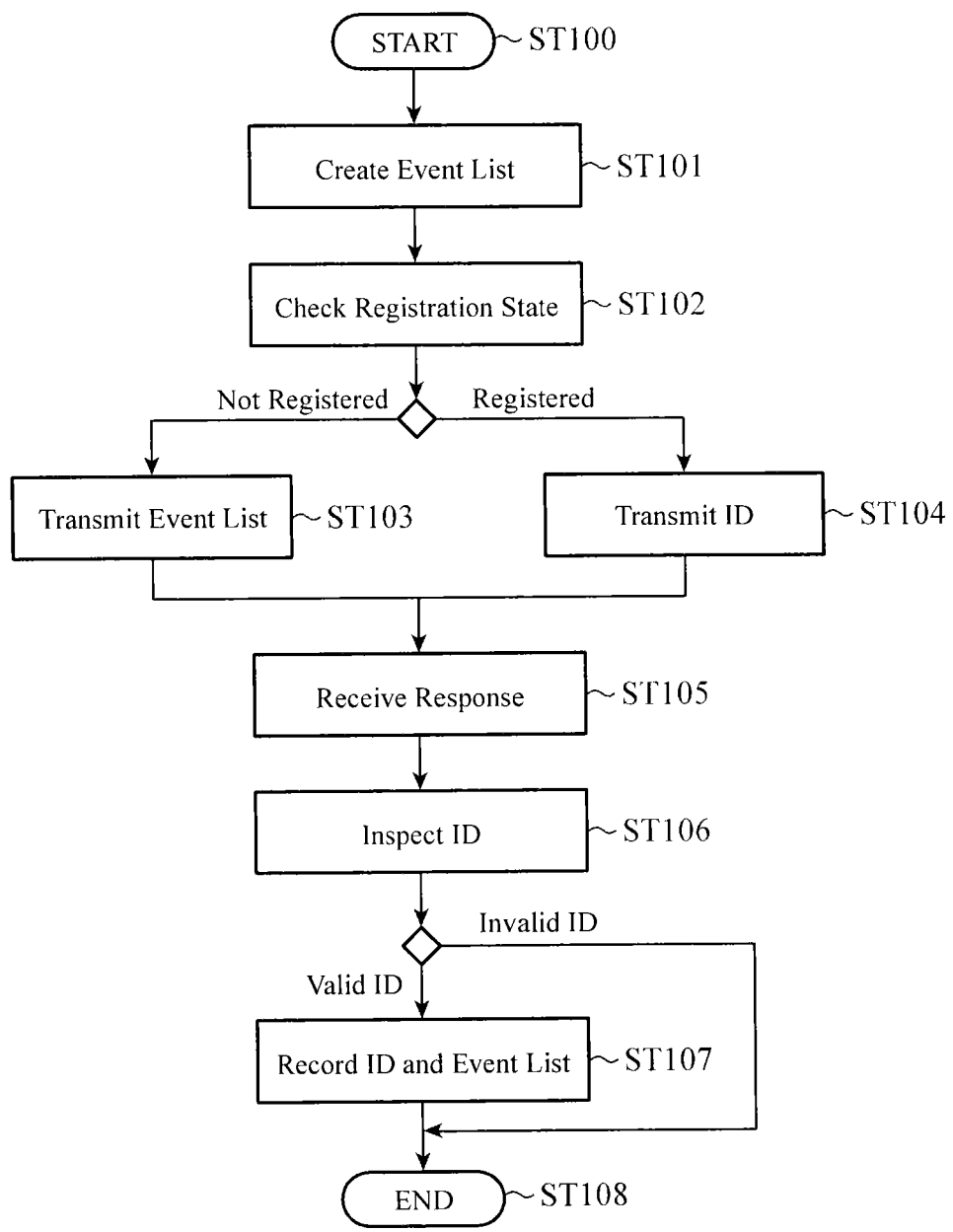
FIG. 4 is a flowchart depicting an operation of a GUI apparatus at the time of registration of an event list in the communication system according to the Embodiment 1 of the present invention.

FIG. 4 is a flowchart depicting an operation of the GUI apparatus 100 at the time of registration of an event list according to this embodiment. It is to be noted that the registration of an event list is performed as part of processing of constructing a screen when a change in content to be displayed occurs due to, for example, screen transition in the GUI logic processor 102. Exemplary triggers for screen transition include a notification of an event from the service apparatus 300 and a notification of an inputted event from the interface 107.

Step ST 100: The GUI logic processor 102 initiates a process of constructing a screen upon, for example, occurrence of screen transition.

Step ST 101: The GUI logic processor 102 provides the event processor 105 with events to be used in the post-transition screen. The event processor 105 uses zero or more events provided by the GUI logic processor 102 to generate an event list 400 and temporarily store the list within the event processor 105. The reason for including a case in which an event list 400 is generated where there is zero event, i.e., no events exist, is to handle a service which does not use events provided from the service apparatus 300.

Step ST 102: The event processor 105 uses the event list 400 temporarily stored at Step ST 101 to conduct search as to whether an element matching the event list 400 is registered with the event list memory 106. In the case of "not registered," the process proceeds to Step ST 103. In the case of "registered", an ID stored in the pertinent element is obtained, and the process proceeds to Step ST 104.

Step ST 103: The event processor 105 transmits the event list 400 through the communicator 104 to the service apparatus 300. For example, the event list 400 has four events stored therein, but the number of events varies depending on the screen, and it is sometimes zero.

Step ST 104: The event processor 105 transmits the ID obtained in Step ST 102 through the communicator 104 to the service apparatus 300. It is to be noted that the service apparatus 300 distinguishes the transmission of event lists from the transmission of IDs coming from the GUI apparatus 100. This is achievable by previously defining a form for transmission data, e.g., a format for URI (Uniform Resource Identifier) of the HTTP request or for the text to be written in BODY.

Step ST 105: The communicator 104 stands by for a response to the transmission executed in Step ST 103 or Step ST 104 from the service apparatus 300. Upon receipt of the response, the communicator 104 gives the response to the event processor 105, and the process proceeds to Step ST 106.

Step ST 106: The response received in Step ST 105 contains the ID depicted in FIG. 3. The event processor 105 determines whether the ID is valid or not. In the case where the ID is zero or no ID is contained in the response, determination of "invalid ID" is made, and the process proceeds to Step ST 108. Other than this case, determination of "valid ID" is made, and the process proceeds to Step ST 107.

Step ST 107: The event processor 105 registers with the event list memory 106 a combination of the ID received in Step ST 105 and the event list 400 temporarily stored by Step ST 101. In a case where an element having a matching ID value exists in the event list memory 106, the portion of the event list in the element is overwritten.

Step ST 108: The event processor 105 discards the event list 400 which has been temporarily stored and activates the function of giving events to the GUI logic processor 102, and then terminates the process. It is to be noted that the function of giving events to the GUI logic processor 102 is appropriately disabled in Step ST 100 or by terminating processing at the transition origin of the screen transition. The events that are received during a period in which the function of giving events to the GUI logic processor 102 is disabled are either accumulated within the event processor 105 or discarded at the event processor 105.

Figure 5:
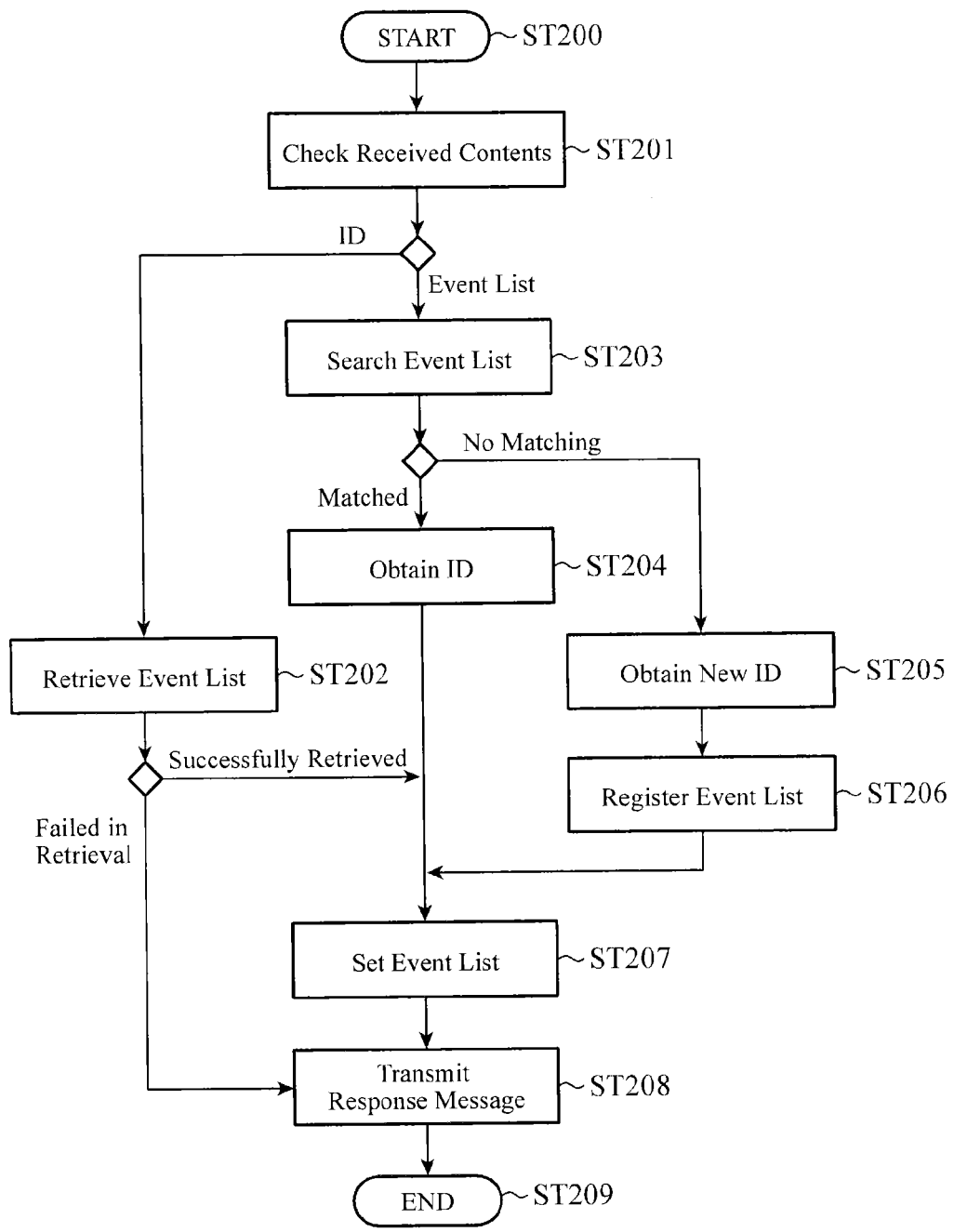
FIG. 5 is a flowchart depicting an operation of a service apparatus at the time of registration of an event list in the communication system according to the Embodiment 1 of the present invention.

FIG. 5 is a flowchart depicting an operation of the service apparatus 300 at the time of registration of an event list according to this embodiment.

Step ST 200: After the GUI apparatus 100 performs transmission processing in ST 103 or ST 104 of FIG. 4, and then the communicator 305 of the service apparatus 300 receives the transmitted data, the service apparatus 300 initiates a process.

Step ST 201: The communicator 305 gives the received data to the event processor 306. The event processor 306 determines which of an ID or an event list the received data is. In the case of the ID, the event processor 306 temporarily stores the ID contained in the received data within the event processor 306, and the process proceeds to Step ST 202. In the case of the event list, the event processor 306 stores the event list contained in the received data within the event processor 306, and the process proceeds to Step ST 203.

Step ST 202: The event processor 306 gives the ID stored at Step ST 201 to the ID manager 307 and requests for search. The ID manager 307 searches an element matching with the ID in the event list memory 308. In the case where a pertinent element is found, the ID manager 307 determines "successfully retrieved" and gives the event list contained in the element found to the event processor 306, and the process proceeds to Step ST 207. In the case where the pertinent element is not found, the ID manager 307 determines "failed in retrieval" and gives the result of determination to the event processor 306, and the process proceeds to Step ST 208.

Step ST 203: The event processor 306 refers to the event list memory 308 and checks whether an element matching with the event list stored by Step ST 201 exists. In the case where a pertinent element exists, decision of "matched" is made, and the process proceeds to Step ST 204. In the case where the pertinent element does not exist, decision of "no matching" is made, and the process proceeds to Step ST 205.

Step ST 204: The event processor 306 temporarily stores, within the event processor 306, the ID of the element matching with the event list that has existed in the event list memory 308 and stored at Step ST 201. The process proceeds to Step ST 207.

Step ST 205: The event processor 306 requests with the ID manager 307 for obtaining an unused ID. The ID manager 307 refers to the event list memory 308, decides an ID that does not exist in the event list memory 308, and gives the decided ID to the event processor 306.

Step ST 206: The event processor 306 registers, with the event list memory 308, a combination of the ID given in Step ST 205 from the ID manager 307 and the event list stored at Step ST 201.

Step ST 207: In the case where the event processor 306 has done Step ST 202, the event list retrieved in Step ST 202 from the event list memory 308 is stored within the event processor 306. Other than this case, nothing is done because the storing operation has been executed in Step ST 201.

Step ST 208: The event processor 306 transmits through the communicator 305 a response message to the GUI apparatus 100. The response message includes the ID obtained in Step ST 201, or given from the ID manager 307 in Step ST 204, or given from the ID manager 307 in Step ST 205. However, in the case of "failed in retrieval" in Step ST 202, an invalid ID (e.g. zero based on Step ST 106) is stored.

Step ST 209: The service apparatus 300 terminates the process.

Figure 6:
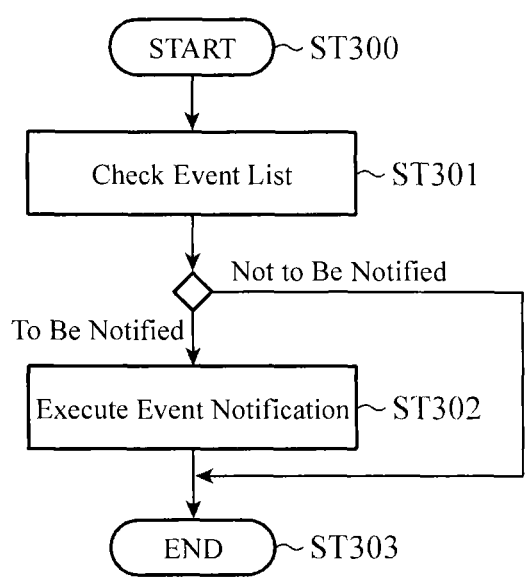
FIG. 6 is a flowchart depicting an operation of the service apparatus at the time of occurrence of an event in the communication system according to the Embodiment 1 of the present invention.

FIG. 6 is a flowchart depicting an operation of the service apparatus 300 at the time of occurrence of an event according to this embodiment.

Step ST 300: When an event occurs in the service A 302 or the service B 303 and the event is given through the service processor 301 to the event processor 306, the service apparatus 300 initiates a process.

Step ST 301: The event processor 306 checks, based on a name of the event given from the service processor 301, whether an event matching with the event list stored within the event processor 306 exists. In the case where a pertinent event exists, the event is decided "to be notified," and the process proceeds to Step ST 302. In the case where the pertinent event does not exist, the event is decided "not to be notified" and the event is discarded, and the process proceeds to Step ST 303.

Step ST 302: The event processor 306 notifies the GUI apparatus 100 through the communicator 305 of the event given from the service processor 301.

Step ST 303: The service apparatus 300 terminates the process.

In this embodiment, in a case where notification of an event from the service apparatus 300 takes place, the GUI apparatus 100 gives the event through the communicator 104 to the event processor 105, and the event processor 105 gives the event to the GUI logic processor 102. Details of these operations are not omitted.

As has been described, in the GUI apparatus 100 of the Embodiment 1, the event processor 105 checks whether an ID for uniquely identifying an event list to be transmitted exists in the event list memory 106 before the GUI apparatus 100 transmits a list of events to be used (i.e. the event list) to the service apparatus 300, and the ID is transmitted if such an ID exists. Upon receipt of the event list, the event processor 306 of the service apparatus 300 uses the ID manager 307 and the event list memory 308 to obtain an unused ID from the ID manager 307 in the case where an element that matches the event list is not found in the event list memory 308, registers a combination of the event list and the ID with the event list memory 308, and transmits the ID to the GUI apparatus 100. Further, the event processor 105 of the GUI apparatus 100 registers with the event list memory 106 a combination of the ID received from the service apparatus 300 and the event list that was going to be transmitted to the service apparatus.

When an event is given from the service processor 301 to the event processor 306 of the service apparatus 300, the event processor 306 uses the event list stored within itself to decide whether the event be notified to the GUI apparatus 100. Hence, event notification being unnecessary for the GUI apparatus 100 is not performed, it allows for reduction in amount of communication from the GUI apparatus 100 to the service apparatus 300.

In the case where an element matching the event list to be transmitted exists in the event list memory 106, the ID, in place of the event list, is transmitted to the service apparatus 300, enabling the event processor 306 to set the event list by using the ID, which also allows for reduction in amount of communication from the GUI apparatus 100 to the service apparatus 300. More specifically, this is because IDs are generally smaller in data amount than event lists. Further, reduction in amount of communication is achievable without previously preparing a correlation between event lists and IDs at the service apparatus 300, which additionally allows for reduction in cost for design and implementation of the correlation between event lists and IDs.

Moreover, while in the above description, an invalid ID is decided where the value of the ID is zero or the response does not contain an ID, another method may also be employed.

As described above, with the communication system of the Embodiment 1, in the communication system including: a GUI apparatus that performs screen construction based on an event notification; and a service apparatus that executes a service and generates an event, the GUI apparatus and the service apparatus being connected with each other through a network to perform mutual communication, wherein the GUI apparatus includes: a GUI apparatus-side event list memory that stores an event list and an ID for uniquely identifying the event list, the event list being a list of the event; and a GUI apparatus-side event processor that transmits to the service apparatus the event list to be used in a screen at the time of screen construction, and that, prior to the transmission, refers to the GUI apparatus-side event list memory and, in a case where the event list matching the event list to be transmitted exists, obtains the ID for uniquely identifying the event list to transmit to the service apparatus the ID in place of the event list to be transmitted, the GUI apparatus-side event processor causing the GUI apparatus-side event list memory to store, in a case where the ID is contained in a response message resulting from the transmission of the event list or the ID to the service apparatus, the ID contained in the response message and the event list transmitted to the service apparatus or the event list whose ID is sent instead, as one combination, wherein the service apparatus includes: a service apparatus-side event list memory that stores the event list and the ID for uniquely identifying the event list, the event list being a list of the event; an ID manager that manages a relation between the event list and the ID; a service processor that executes the service to generate the event; and an event processor that, when the event list is received from the GUI apparatus, refers to the service apparatus-side event list memory; in a case where the event list matching the received event list exists, obtains the ID for uniquely identifying the event list to include the ID in the response message to the GUI apparatus and transmit the response message; and in a case where the event list matching the received event list is absent as a result of referring to the service apparatus-side event list memory, obtains from the ID manager an ID unregistered with the service apparatus-side event list memory to register with the service apparatus-side event list memory the obtained ID and the received event list as one combination, and includes the obtained ID in the response message to the GUI apparatus and transmits the response message, and that, when the ID is received from the GUI apparatus, refers to the service apparatus-side event list memory to, in a case where the event list matching the received ID exists, include the received ID in the response message to the GUI apparatus and transmit the response message, and wherein the service apparatus-side event processor makes a determination on the event to be generated based on the service of the service processor as to whether the event list containing the event is to be notified to the GUI apparatus, and notifies the GUI apparatus of the event only in a case where the event list is to be notified. Therefore, the amount of communication between the GUI apparatus and the service apparatus is reduced, and patterns of events are flexibly changeable.

(Embodiment 2)

In the Embodiment 1, description is given of registration of a combination of an event list and an ID with the event list memory 106 and the event list memory 308. In Embodiment 2, an example is described in which limit of the memory capacity set with the event list memory 308 is addressed, such that the use efficiency of resources of the service apparatus 300 is improved.

Figure 7:
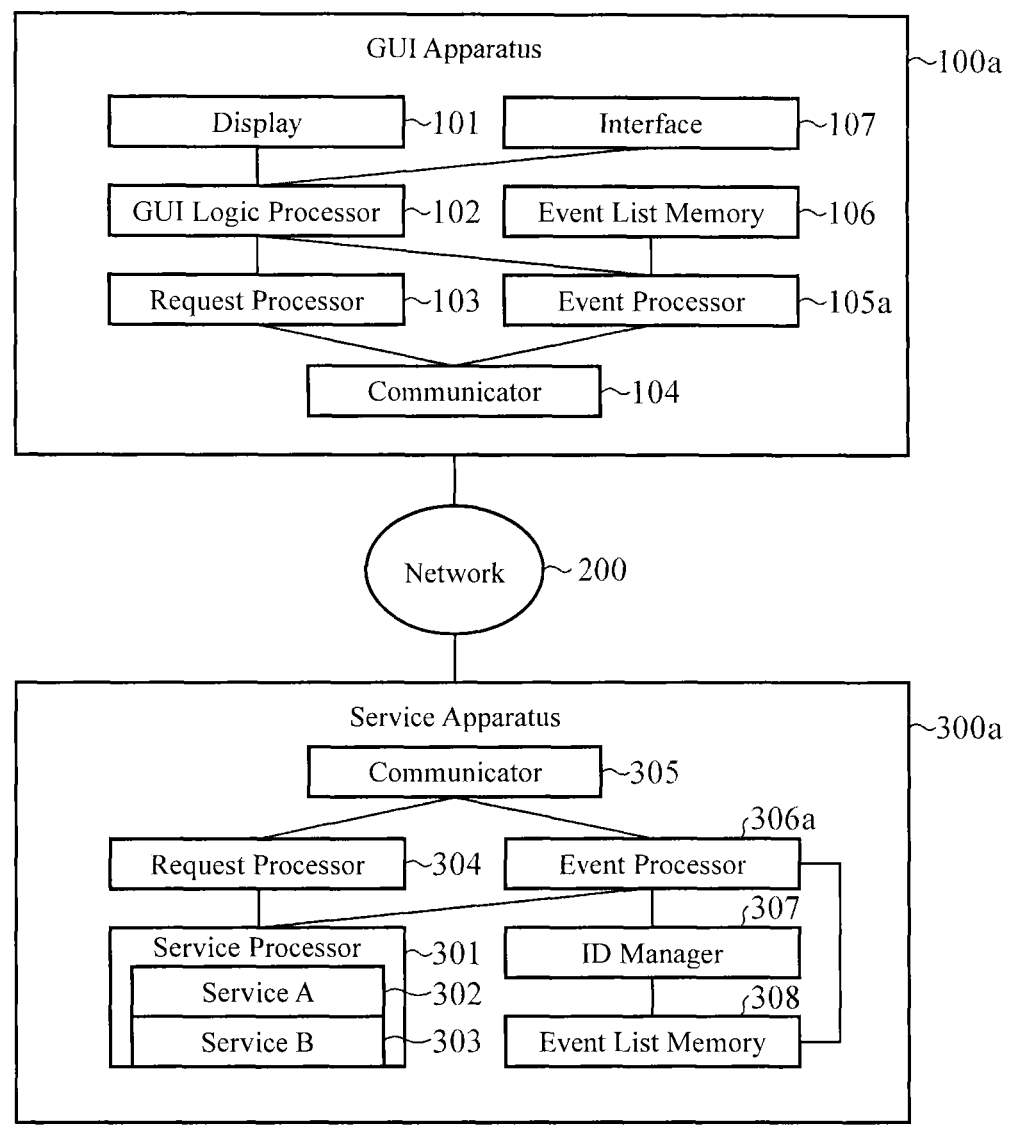
FIG. 7 is a configuration diagram depicting a communication system according to Embodiment 2 of the present invention.

FIG. 7 depicts an overall configuration of a communication system according to the Embodiment 2 of the invention.

The communication system has a configuration similar to the Embodiment 1, in which a GUI apparatus 100a and a service apparatus 300a are connected with each other through a network 200.

The GUI apparatus 100a includes a display 101, a GUI logic processor 102, a request processor 103, a communicator 104, and an event processor (a GUI apparatus-side event processor) 105a, an event list memory (a GUI apparatus-side event list memory) 106, and an interface 107. Since the display 101, the GUI logic processor 102, the request processor 103, the communicator 104, the event list memory 106, and the interface 107 have the same configurations as those of the Embodiment 1, description thereof is omitted here.

The event processor 105a is a device configured to execute a process relating to events in the GUI apparatus 100a. The event processor 105a has an additional function, with respect to the event processor 105 of the Embodiment 1, of deleting an element comprising a combination of an event list and an ID to be performed with the event list memory 106.

The service apparatus 300a includes a service processor 301, a request processor 304, a communicator 305, an event processor (a service apparatus-side event processor) 306a, an ID manager 307, and an event list memory (a service apparatus-side event list memory) 308. The service processor 301, the request processor 304, the communicator 305, and the ID manager 307 have the same configurations as those of the Embodiment 1, and description thereof is omitted here. Regarding the event list memory 308, information of a registrable data size is added, which is not illustrated.

The event processor 306a is a device configured to execute a process relating to events in the service apparatus 300a. The event processor 306a has an additional function, with respect to the event processor 306 of the Embodiment 1, of deleting an element comprising a combination of an event list and an ID to be performed with the event list memory 308.

Figure 8:
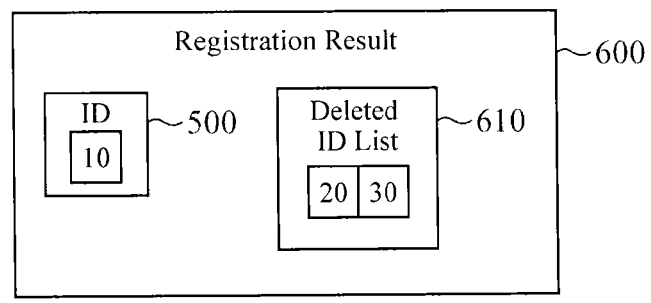
FIG. 8 is an explanatory diagram depicting a registration result contained in a response message in the communication system according to the Embodiment 2 of the present invention.

FIG. 8 depicts a configuration of a registration result 600 that is contained in a response message to be transmitted from the service apparatus 300a to the GUI apparatus 100a in response to a request for registration of an event list from the GUI apparatus 100a. The registration result 600 includes an ID 500 for uniquely identifying a registered event list and a deleted ID list 610 that has a row of deleted IDs. For example, in FIG. 8, the deleted ID list 610 has two IDs (the values are 20 and 30) stored therein. It is to be noted that the terminal end of the deleted ID list 610 is recognizable by an element signifying the number of elements or a termination, which is omitted in FIG. 8.

Next, description is given of operations of the GUI apparatus 100a and the service apparatus 300a with reference to FIGS. 7, 8, 9, and 10.

Figure 9:
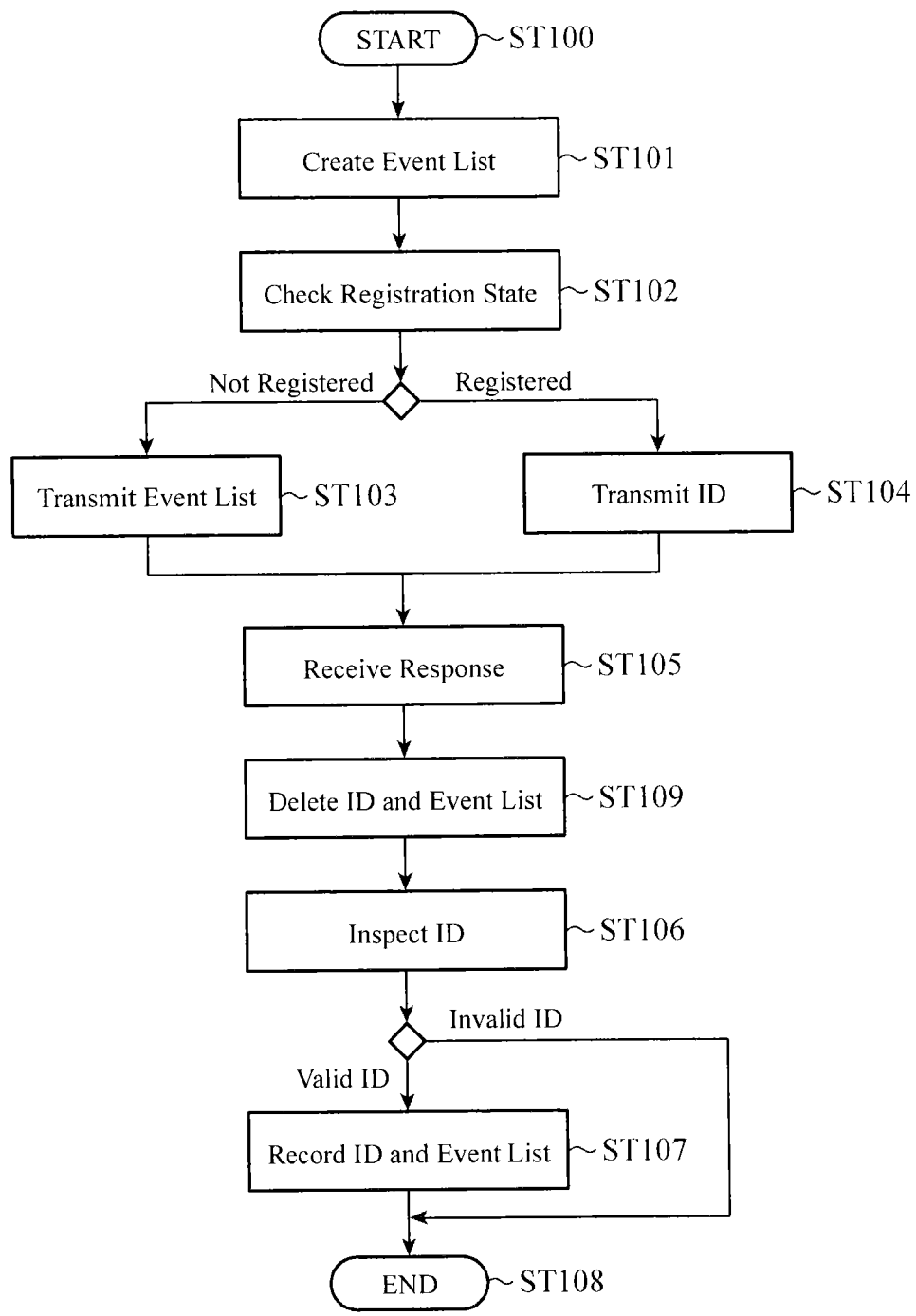
FIG. 9 is a flowchart depicting an operation of a GUI apparatus at the time of registration of an event list in the communication system according to the Embodiment 2 of the present invention.

FIG. 9 is a flowchart depicting an operation of the GUI apparatus 100a at the time of registration of an event list according to this embodiment.

In Steps ST 100, ST 101, ST 102, ST 103, ST 104, ST 105, ST 106, ST 107, and ST 108, the operation of the event processor 105 of the Embodiment 1 is not different from the operation of the event processor 105a of the Embodiment 2 except that the executed following Step ST 105 is changed to Step ST 109, and that the communication is performed with the service apparatus 300a and not the service apparatus 300. Thus, description of these steps is omitted here.

Step ST 109: The event processor 105a refers to the deleted ID list 610 that is contained in the response received in Step ST 105 sequentially from the head and deletes elements that include the IDs from the event list memory 106. In the example of FIG. 8, the elements having IDs of 20 and 30 are to be deleted from the event list memory 106. The event processor 105a causes the process to proceeds to Step ST 106 upon reaching the terminal end of the ID list 610.

Figure 10:
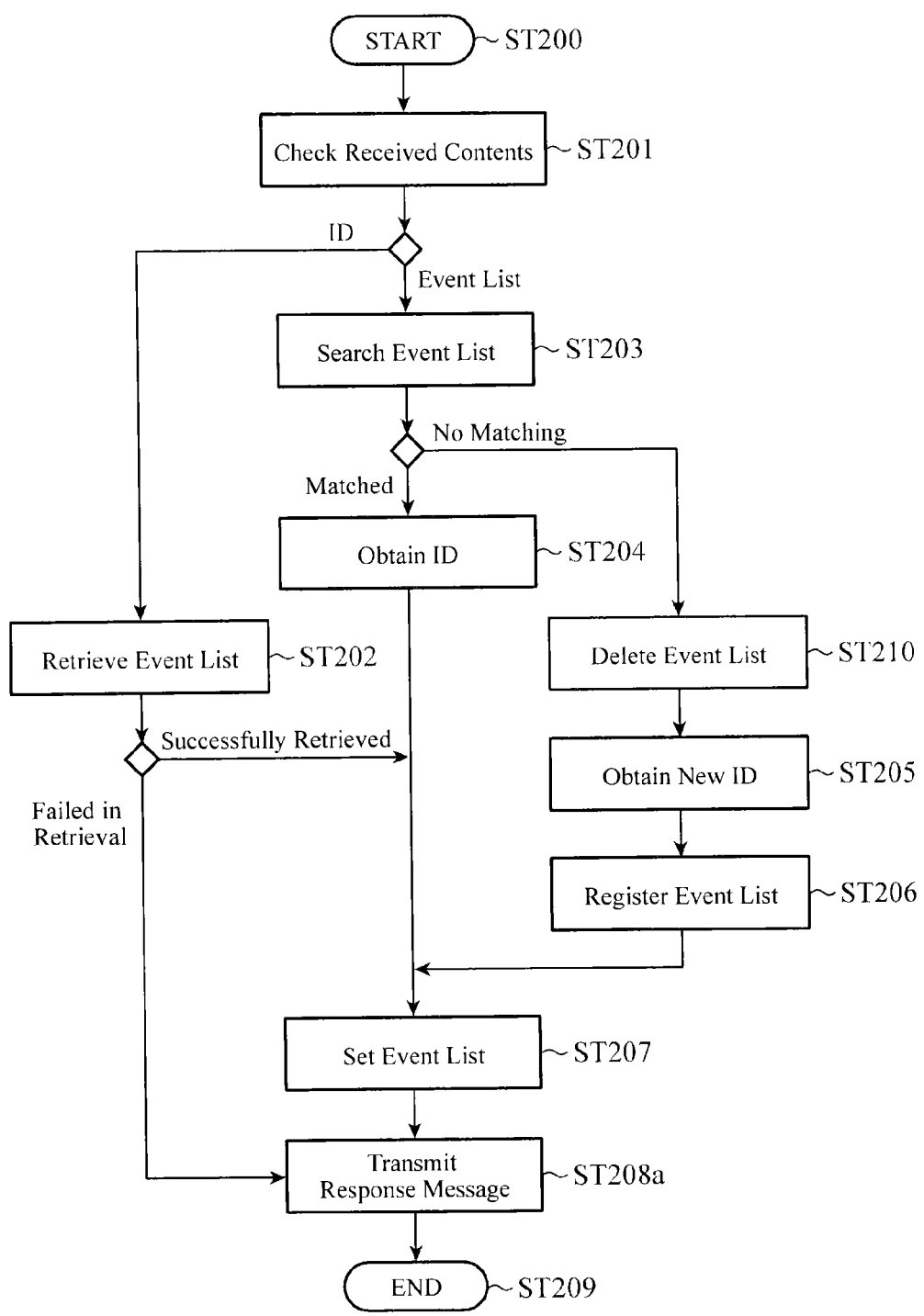
FIG. 10 is a flowchart depicting an operation of a service apparatus at the time of registration of an event list in the communication system according to the Embodiment 2 of the present invention.

FIG. 10 is a flowchart depicting an operation of the service apparatus 300a at the time of registration of an event list according to this embodiment.

In Steps ST 200, ST 201, ST 202, ST 203, ST 204, ST 205, ST 206, ST 207, and ST 209, in the case where Step ST 205 is executed after Step ST 203, the operation of the event processor 306 of the Embodiment 1 is not different from the operation of the event processor 306a of the Embodiment 2 except that the execution of Step ST 210 precedes, that Step ST 208a is executed in place of Step ST 208, and that the communication is performed with the GUI apparatus 100a and not the GUI apparatus 100. Thus, description of these steps is omitted here.

Step ST 210: The event processor 306a uses: (a) the size of the event list having been stored at Step ST 201 and the size of the ID; (b) the sizes of elements registered with the event list memory 308; and (c) the registrable data size of the event list memory 308. When an inequality "(a)+(b)>(c)" is true, the event processor 306a deletes one or more elements registered with the event list memory 308 to nullify this inequality. A variety of criteria is adoptable for selecting an element to be deleted, such as one with a minimum size among the sizes larger than (a) or one with the oldest registration time and sequentially onwards, and one with a minimum number of hits in searches using event lists and IDs and sequentially onwards; however, insofar as the goal is achieved, any criterion may be used. When a condition where the above inequality is no longer true is achieved, the process proceeds to Step ST 205.

Step ST 208a: The event processor 306a transmits a response message through the communicator 305 to the GUI apparatus 100. The response message includes the registration result 600. The ID 500 includes the ID that is obtained in Step ST 201, or given in Step ST 204 from the ID manager 307, or given in Step ST 205 from the ID manager 307. The deleted ID list 610 includes zero or more IDs of the element(s) deleted in Step ST 210 (in the case of zero, the value signifying a termination is stored.) It is to be noted that in the case of "failed in retrieval" in Step ST 202, an invalid ID is set for the ID 500, and the deleted ID list 610 is emptied.

Since the operation of the service apparatus 300a at the time of occurrence of an event of this embodiment is the same as that of the Embodiment 1, description thereof is omitted here.

Furthermore, according to this embodiment, since the operation of the GUI apparatus 100a in the case of occurrence of notification of an event from the service apparatus 300a is the same as that of the Embodiment 1, description thereof is omitted here (the GUI apparatus 100, the service apparatus 300, and the event processor 105 are substituted with the GUI apparatus 100a, the service apparatus 300a, and the event processor 105a, respectively).

As described above, the service apparatus 300a of the Embodiment 2 deletes elements from the event list memory 308 to be within the limit of registrable data size of the event list memory 308 at the time of registering a new event list with the event list memory 308. The GUI apparatus 100a receives from the service apparatus 300a the deleted ID list 610 to be generated as a result of the deletion and deletes the pertinent element(s) from the event list memory 106. This allows for obviating lack of resource such as depletion of the memory, which could happen due to expansion of the size of data registered with the event list memory 308. Setting the limit on the size of data to be registered with the event list memory 308 also allows for restraining a maximum time to be taken for performing processing on the event list memory 308. Moreover, the GUI apparatus 100a is also provided with the ID(s) of the deleted element(s), which additionally allows for prevention of occurrence of such a phenomenon that the element corresponding to the ID designated by the GUI apparatus 100a does not exist in the event list memory 308, thus cutting unnecessary communication between the GUI apparatus 100a and the service apparatus 300a.

It is to be noted that while in this embodiment, description is given of how to deal with a limit of registrable data size of the event list memory 308 in the service apparatus 300a, a similar procedure may be adopted for the GUI apparatus 100a to deal with a limit of registrable data size of the event list memory 106. Specifically, the event processor 105a may determine whether the size of data registrable with the event list memory 106 is exceeded in a case where an ID is contained in a response message that is available as a result of transmitting an event list or an ID to the service apparatus 300a. When exceeded, one or more combinations of an event list and an ID that are registered with the event list memory 106 are deleted so as to be within the limit, and in this state, the ID contained in the response message and the event list transmitted from the GUI apparatus 100a or the event list whose ID is transmitted instead may be registered with the event list memory 106 as one combination.

As described above, in the communication system of the Embodiment 2, the service apparatus-side event processor is configured to determine, before registering the combination of the event list received from the GUI apparatus and the ID for uniquely identifying the event list with the service apparatus-side event list memory, as to whether a size of the combination exceeds a size of data registrable with the service apparatus-side event list memory, and in a case where the size exceeds, delete a combination of an event list and an ID having been registered with the service apparatus-side event list memory to be within the size and registers in this state the combination of the event list received from the GUI apparatus and the ID for uniquely identifying the event list with the service apparatus-side event list memory, and include the ID for uniquely identifying the deleted event list in the response message to the GUI apparatus and transmits the response message, and wherein the GUI apparatus-side event processor, in a case where the response message resulting from the transmission of the event list or the ID to the service apparatus contains the ID deleted from the service apparatus-side event list memory, deletes the event list corresponding to the deleted ID from the GUI apparatus-side event list memory. Therefore, lack of resource on the side of the service apparatus is inhibited, and unnecessary communication is reduced between the GUI apparatus and the service apparatus.

Furthermore, in the communication system of the Embodiment 2, in a case where the ID is contained in the response message resulting from the transmission of the event list or the ID to the service apparatus, the GUI apparatus-side event processor is configured to determine as to whether a size registrable with the GUI apparatus-side event list memory is exceeded, and in a case where the size is exceeded, the GUI apparatus-side event processor deletes a combination of an event list and an ID, the combination being registered with the GUI apparatus-side event list memory, to be within the size and registers in this state with the GUI apparatus-side event list memory the ID contained in the response message and the event list transmitted from the GUI apparatus or the event list whose ID is transmitted instead, as one combination. Therefore, lack of resource on the side of the GUI apparatus is inhibited.

(Embodiment 3)

In the above-described Embodiments 1 and 2, either an event list itself or an ID for uniquely identifying the event list is transmitted in the case where registration of the event list is requested from the GUI apparatus 100 (GUI apparatus 100a) to the service apparatus 300 (service apparatus 300a). Meanwhile, transmission of an entire event list is inefficient in a case where difference is slight, e.g., one additional event, between the event list to be transmitted and the event list registered with the event list memory 106. In Embodiment 3, a difference from the registered event list is used to reduce the amount of communication as compared with the case in which the event list itself is transmitted.

Figure 11:
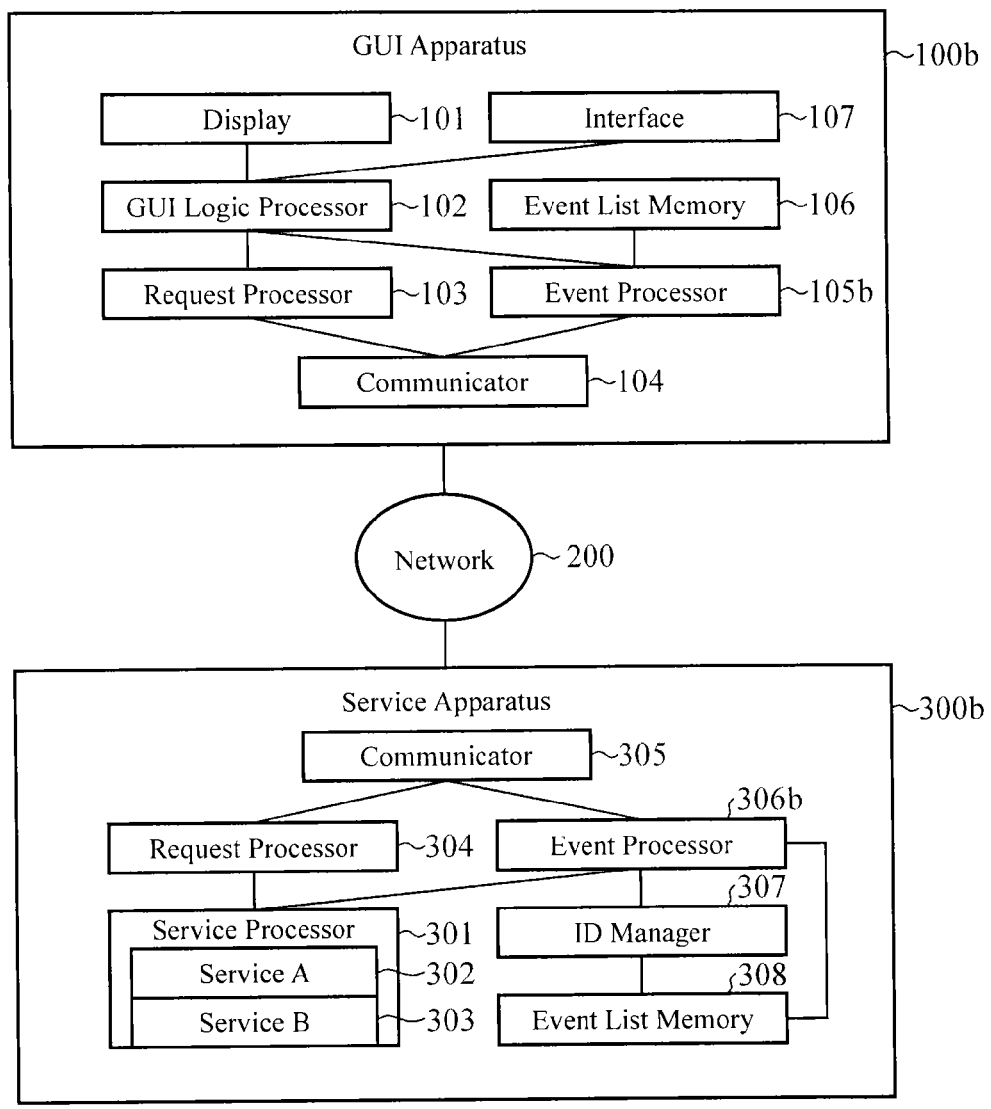
FIG. 11 is a configuration diagram depicting a communication system according to Embodiment 3 of the present invention.

FIG. 11 depicts a configuration of an overall system according to the Embodiment 3 of the invention.

The system has a configuration in which a GUI apparatus 100b and a service apparatus 300b are connected with each other through a network 200.

The GUI apparatus 100b includes a display 101, a GUI logic processor 102b, a request processor 103, a communicator 104, an event processor (a GUI apparatus-side event processor) 105b, and an event list memory (a GUI apparatus-side event list memory) 106, and an interface 107. Since the display 101, the GUI logic processor 102b, the request processor 103, the communicator 104, the event list memory 106, and the interface 107 have the same configurations as those of the Embodiment 1, description thereof is omitted here.

The event processor 105b is a device configured to execute a process relating to events in the GUI apparatus 100b. The event processor 105b has an additional function, with respect to the event processor 105 of the Embodiment 1, of requesting with the service apparatus 300b for registration of an event list using an ID and difference in event list.

The service apparatus 300b includes a service processor 301, a request processor 304, a communicator 305, an event list processor (a service apparatus-side event list processor) 306b, an ID manager 307, and an event list memory (a service apparatus-side event list memory) 308. Since the service processor 301, the request processor 304, the communicator 305, the ID manager 307, and the event list memory 308 have the same configurations as those of the Embodiment 1, description thereof is omitted here.

The event processor 306b is a device configured to execute a process relating to events in the service apparatus 300b. The event processor 306b has an additional function, with respect to the event processor 306 of the Embodiment 1, of registering an event list by using an ID and a difference in event list.

Figure 12:
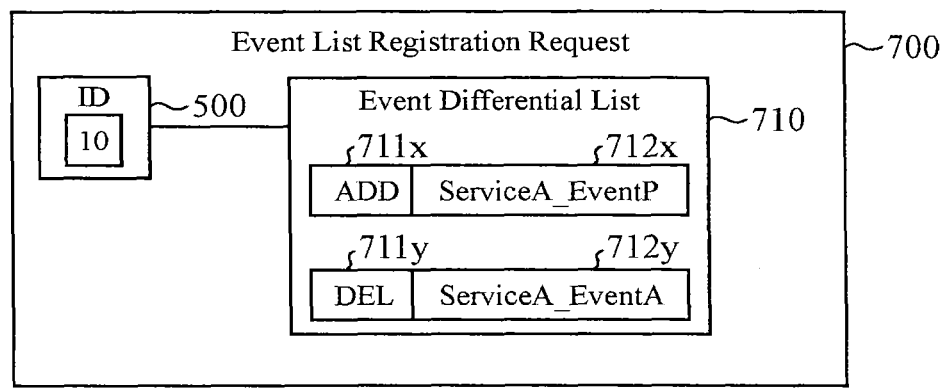
FIG. 12 is an explanatory diagram depicting a request for registration of an event list in the communication system according to the Embodiment 3 of the present invention.

FIG. 12 depicts a configuration of an event list registration request 700 to be transmitted in a case where the GUI apparatus 100b requests with the service apparatus 300b for registration of an event list by using an ID and a difference in event list. The event list registration request 700 includes an ID 500 and an event differential list 710. The event differential list 710 includes a row of elements comprising combinations of an operation type 711 and an event name 712. In FIG. 12, two elements are stored, i.e., "operation type 711x; event name 712x" and "operation type 711y; event name 712y". The operation type 711x "ADD" signifies addition of the event name 712x to a reference event, and the operation type 711y "DEL" signifies deletion of the event name 712y from a reference event list. It is to be noted that the terminal end of the event differential list 710 is recognizable by an element signifying the number of elements or a termination, which is omitted in FIG. 12.

Next, operations of the GUI apparatus 100b and the service apparatus 300b are described with reference to FIGS. 3, 11, 12, 13, and 14.

Figure 13:
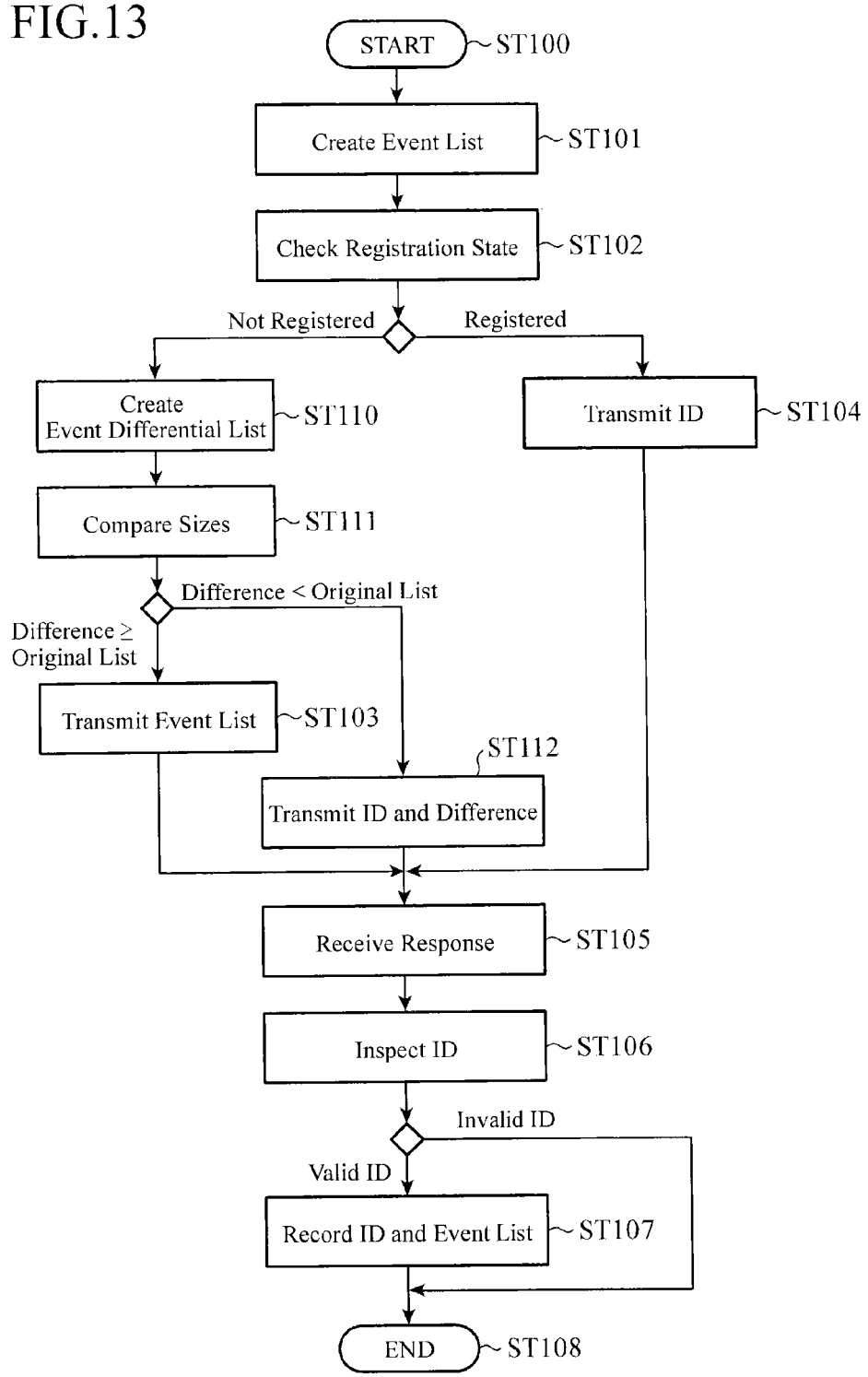
FIG. 13 is a flowchart depicting an operation of a GUI apparatus at the time of registration of an event list in the communication system according to the Embodiment 3 of the present invention.

FIG. 13 is a flowchart depicting an operation of the GUI apparatus 100b at the time of registration of an event list according to this embodiment.

In Steps ST 100, ST 101, ST 102, ST 103, ST 104, ST 105, ST 106, ST 107, and ST 108, the operation of the event processor 105 of the Embodiment 1 is not different from the operation of the event processor 105b of the Embodiment 3 except that the process following Step ST 102 in a case where decision of "not registered" is made is changed to Step ST 110, and that the communication is performed with the service apparatus 300b and not the service apparatus 300. Thus, description of these steps is omitted here.

Step ST 110: The event processor 105b generates an event differential list 710 by using the event list temporarily stored therewithin in Step ST 101 and the event lists of the elements registered with the event list memory 106, and selects one with a minimum number of elements from the event differential list 710. At the same time, the event processor 105b obtains IDs for uniquely identifying the event lists that have been used for creating the event differential list 710 from the event list memory 106. For example, in the case where the event list 400A and the ID 500A of FIG. 3 are registered with the event list memory 106 and the event list that is going to be transmitted this time is configured as "ServiceA_EventB," "ServiceA_EventC," "ServiceA_EventP," and "ServiceB_EventX," the event differential list to be generated is as denoted by the reference numeral 710, and the value of the ID 500 is "10". It is to be noted that the operation type 711x "ADD" and the event name 712x "ServiceA_EventP" in the event differential list 710 denote addition of "ServiceA_EventP" to the event list. The operation type 711y "DEL" and the event name 712y "ServiceA_EventA" denote deletion of "ServiceA_EventA" from the event list.

Step ST 111: The event processor 105b compares the number of elements indicating the amount of information of the event list temporarily stored at Step ST 101 with the number of elements indicating the amount of information of the event differential list 710 generated in Step ST 110. In the case where the number of elements of the temporarily stored event list is larger, "difference<original list" is decided, and the process proceeds to Step ST 112. Other than this case, "difference≥original list" is decided, and the process proceeds to Step ST 103. In the case where nothing is registered with the event list memory 106, the process proceeds to Step ST 103 unconditionally.

Step ST 112: The event processor 105b uses the event differential list 710 obtained in Step ST 110 and the IDs for uniquely identifying the event lists used for creation of the event differential list 710 to generate an event list registration request 700, and transmits the event list registration request 700 through the communicator 104 to the service apparatus 300.

Figure 14:
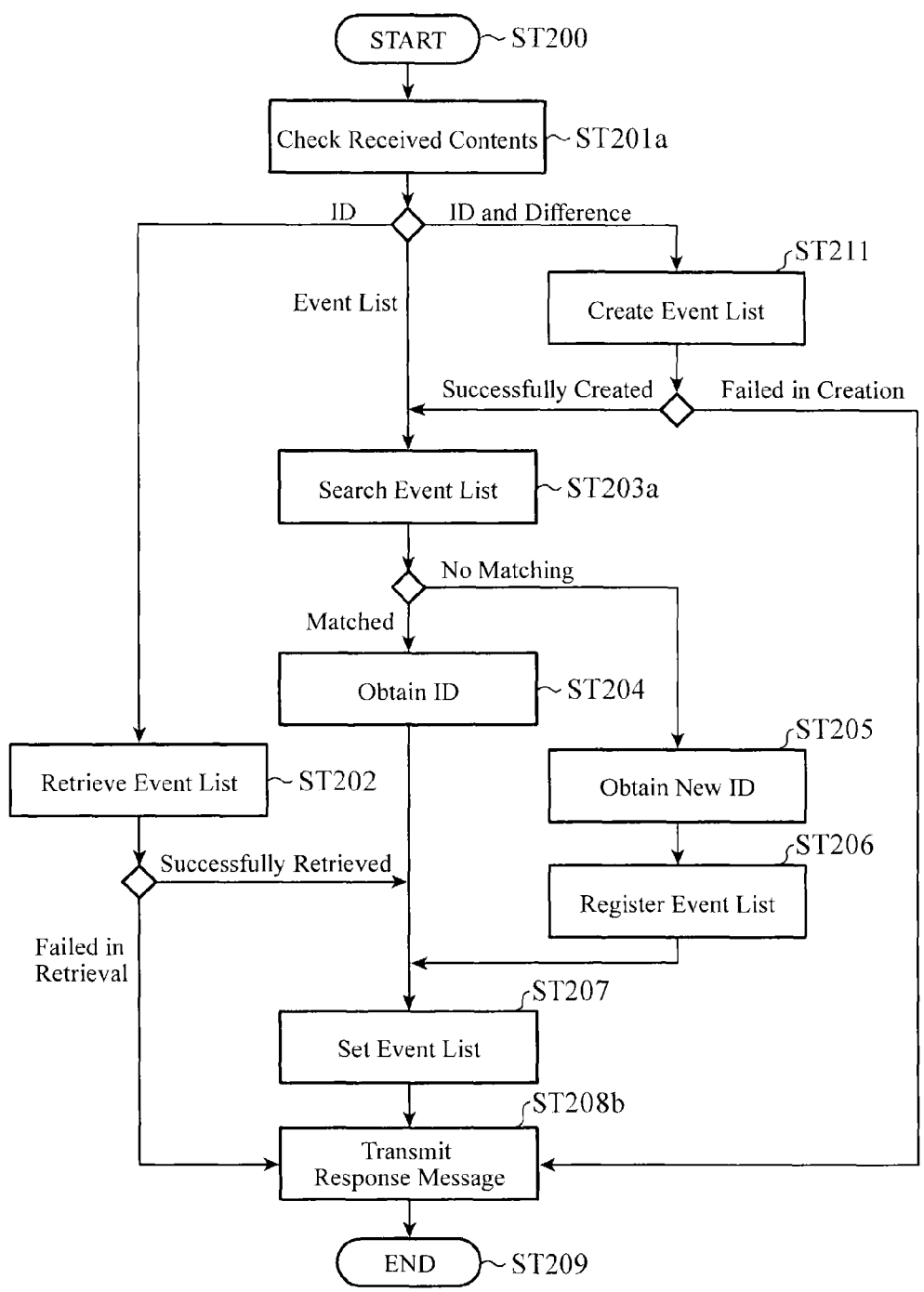
FIG. 14 is a flowchart depicting an operation of a service apparatus at the time of registration of an event list in the communication system according to the Embodiment 3 of the present invention.

FIG. 14 is a flowchart depicting an operation of the service apparatus 300b at the time of registration of an event list according to this embodiment.

In Steps ST 200, ST 202, ST 204, ST 205, ST 206, ST 207, and ST 209, the operation of the event processor 306 of the Embodiment 1 is not different from the operation of the event processor 306a of the Embodiment 3 except that the communication is performed with the GUI apparatus 100b and not the GUI apparatus 100. Thus, description of these steps is omitted here.

Step ST 201a: The communicator 305 gives the received data to the event processor 306b. The event processor 306b determines the type of the received data (an ID, an event list, or an ID with a difference). In the case where the received data include an ID, the event processor 306b stores the ID contained in the received data, and the process proceeds to Step ST 202. In the case where the received data include an event list, the event processor 306b stores the event list contained in the received data, and the process proceeds to Step ST 203a. In the case where the received data include an ID with a difference, the process proceeds to Step ST 211.

Step ST 211: The event processor 306b gives the ID contained in the received data to the ID manager 307 in order to request for search. The ID manager 307 conducts search as to whether a matching element is registered with the event list memory 308 by using the ID. In the case where a pertinent element is not found, the event processor 306b decides "failed in creation," and the process proceeds to Step ST 208b. In the case where a pertinent element is found, the ID manager 307 gives the event list contained in the element found to the event processor 306b, and the event processor 306b uses the event list and the event differential list 710 contained in the received data to generate an event list to be registered. Specifically, the event name 712 of the element with the operation type 711 indicating "ADD" is added to the event list given by the ID manager 307 and deletes the event name 712 of the element with the operation type 711 indicating "DEL." Then, the event processor 306b stores the generated event list and decides "successfully generated," and the process proceeds to Step ST 203a.

Step ST 203a: The event processor 306b refers to the event list memory 308 by using the event list stored at Step ST 201 or Step ST 211 to check whether a matching element exists. In the case where the element exists, decision of "matched" is made, the process proceeds to Step ST 204. In the case where the element does not exist, decision of "no matching" is made, and the process proceeds to Step ST 205.

Step ST 208b: The event processor 306b transmits a response message through the communicator 305 to the GUI apparatus 100. The ID that is obtained in Step ST 201, or is given in Step ST 204 from the ID manager 307, or is given in Step ST 205 from the ID manager 307 is stored in the response message. It is to be noted that in the case of "failed in retrieval" in Step ST 202 or "failed in creation" in Step ST 211, an invalid ID is stored.

Since the operation of the service apparatus 300b at the time of occurrence of an event of this embodiment is the same as that of the Embodiment 1, description thereof is omitted here.

Since the operation of the GUI apparatus 100b at the time of occurrence of notification of an event from the service apparatus 300b of this embodiment is the same as that of the Embodiment 1, description thereof is omitted here (the GUI apparatus 100, the service apparatus 300, and the event processor 105 are substituted with the GUI apparatus 100b, the service apparatus 300b, and the event processor 105b, respectively).

As has been described, the GUI apparatus 100b of the Embodiment 3 generates a difference by using the event list registered with the event list memory 106 before transmitting the event list to the service apparatus 300b. In a case where the size of the difference is smaller, the ID for uniquely identifying the event list used for creation of the difference and the generated difference are transmitted to the service apparatus 300b, and the service apparatus 300b uses the received ID and difference as well as the event list stored on the event list memory 308 to generate an event list to be registered. Hence, the amount of communication is reduced as compared to the case in which the event list itself is transmitted.

Although, in the description of this embodiment, the number of elements in the difference in event list is referenced to select a minimum amount of information, the data size may be used for a reference for the amount of information, for example.

In the description of this embodiment, character strings such as "ADD" and "DEL" are set in the operation type 711, however, the effect obtained from this embodiment is the same when numerical expressions are used instead.

Furthermore, in this embodiment, description is given of a procedure in which addition is made with respect to the GUI apparatus 100 and the service apparatus 300 of the Embodiment 1, needless to say, however, the effects of this embodiment are available by adding a similar procedure to the GUI apparatus 100a and the service apparatus 300a of the Embodiment 2.

As described above, in the communication system of the Embodiment 3, in a case where an event list unregistered with the GUI apparatus-side event list memory is to be transmitted to the service apparatus, the GUI apparatus-side event processor is configured to generate a difference between the event list to be transmitted and the event list registered with the GUI apparatus-side event list memory, and in a case where an amount of information indicating the generated difference is smaller than an amount of information of the event list to be transmitted, the GUI apparatus-side event processor transmits to the service apparatus the generated difference and the ID for uniquely identifying the event list registered with the GUI apparatus-side event list memory, the event list being used for creating the difference, in place of the event list to be transmitted, and wherein, in a case where the ID and the difference are received from the GUI apparatus, the service apparatus-side event processor obtains the event list from the service apparatus-side event list memory by using the ID, generates a new event list by using the obtained event list and the difference, and processes the newly generated event list in place of the event list received from the GUI apparatus. Therefore, further reduction in amount of communication is achieved between the GUI apparatus and the service apparatus.

(Embodiment 4)

In the above-described Embodiments 1, 2 and 3, the events that have occurred at the service apparatus 300 (the service apparatus 300a and the service apparatus 300b) are subjected to determination whether to notify at the event processor 306 (the event processor 306a and the event processor 306b) immediately followed by the operation of notifying the GUI apparatus 100 (the GUI apparatus 100a and the GUI apparatus 100b.) The cycle and frequency of occurrence of events are often defined by the specifications of the service apparatus, i.e., the origin of the events, whereas depending on the specifications of the GUI apparatus, a longer cycle and a fewer frequency of notification are sometimes desired than those defined in the specifications of the service. However, it is not desired to change the specifications of the service apparatus for the sake of convenience of the GUI apparatus. Thus, in Embodiment 4, a mechanism is added, in which notification cycles are set per event by the GUI apparatus, such that the notification cycles are rendered changeable without changing the specifications of the service apparatus. Further, events of the same notification cycle are notified collectively, thus reducing the number of communication between the service apparatus and the GUI apparatus.

Figure 15:
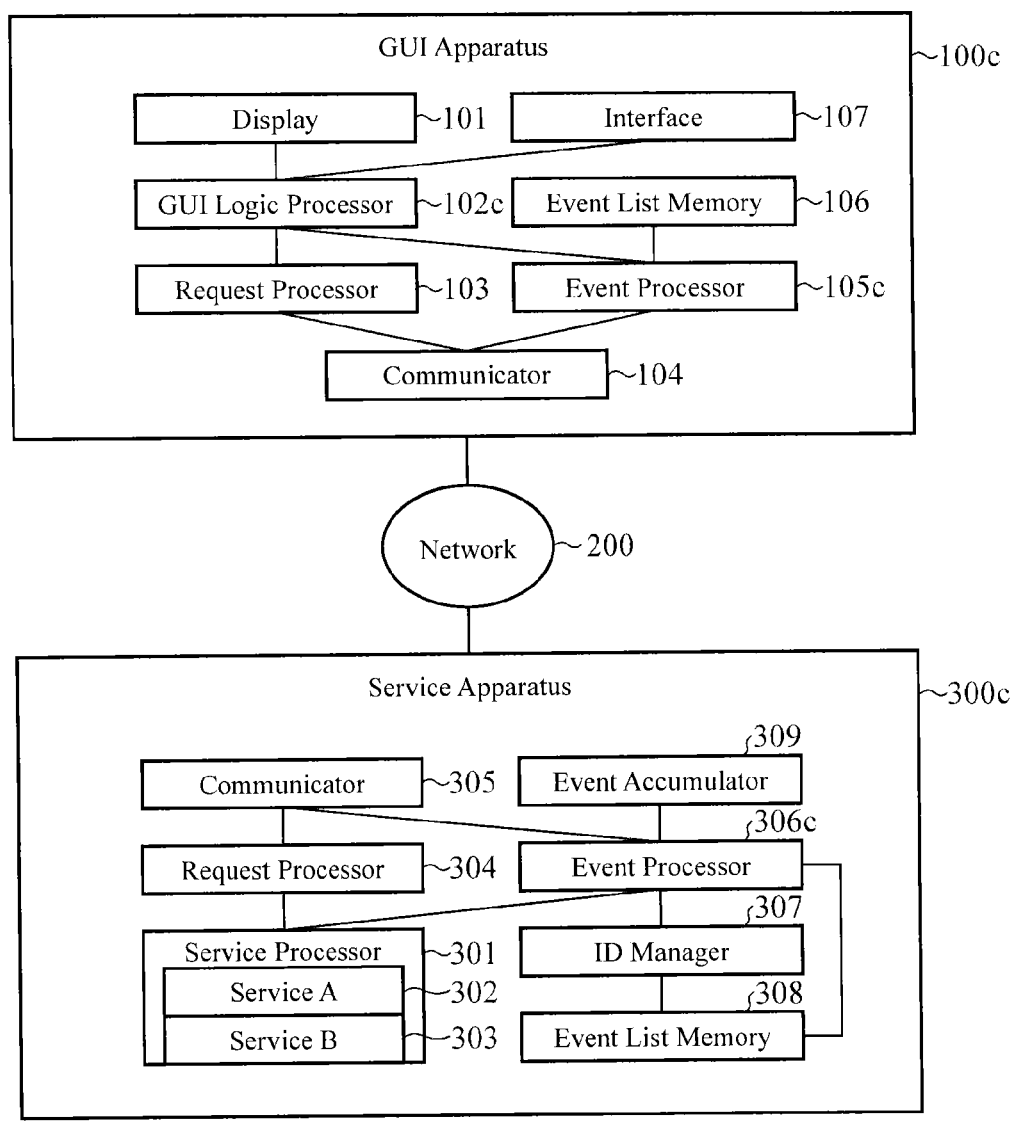
FIG. 15 is a configuration diagram depicting a communication system according Embodiment 4 of the present invention.

FIG. 15 depicts a configuration of an overall system of the Embodiment 4 of the invention.

The system has a configuration in which a GUI apparatus 100c and a service apparatus 300c are connected with each other through a network 200.

The GUI apparatus 100c includes a display 101, a GUI logic processor 102c, a request processor 103, a communicator 104, an event processor (a GUI apparatus-side event processor) 105c, an event list memory 106, and an interface 107. Since the display 101, the request processor 103, the communicator 104, the event list memory 106, and the interface 107 have the same configurations as those of the Embodiment 1, description thereof is omitted here.

The GUI logic processor 102c is a device that is configured to construct a GUI to be displayed on the display 101 and collaborate with the interface 107 to perform input and output. The GUI logic processor 102c is also configured to issue a request through the request processor 103 to the service apparatus 300, configured to change the GUI to be displayed on the display 101 based on the event notified from the event processor 105c, and configured to perform output other than the GUI through the interface 107. The GUI logic processor 102c provides the event processor 105c with the notification cycles of the events also when events for use in screens are provided to the event processor 105c.

The event processor 105c is a device configured to execute a process relating to events in the GUI apparatus 100c. The event processor 105c has additional functions, with respect to the event processor 105 of the Embodiment 1, of setting notification cycles per event and of handling notification including a plurality of events.

The service apparatus 300c includes a service processor 301, a request processor 304, a communicator 305, an event processor (a service apparatus-side event processor) 306c, an ID manager 307, an event list memory 308, and an event accumulator 309. Since the service processor 301, the request processor 304, the communicator 305, and the ID manager 307 have the same configurations as those of the Embodiment 1, description thereof is omitted here.

The event processor 306c is a device configured to execute a process relating to events in the service apparatus 300c. The event processor 306c has additional functions, with respect to the event processor 306 of the Embodiment 1, of setting the notification cycles of events and of notifying a plurality of events collectively. The event accumulator 309 is a device for temporarily storing events to be notified.

Figure 16:
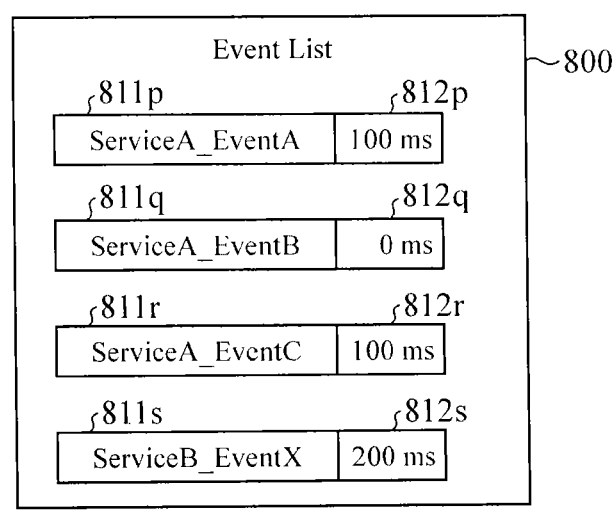
FIG. 16 is a flowchart depicting an operation of a service apparatus at the time of occurrence of an event in the communication system according to the Embodiment 4 of the present invention.

FIG. 16 depicts a configuration of an event list 800 according to this embodiment. Assuming that a combination of an event name 811 and a notification cycle 812 is regarded as one element, the event list 800 has zero or more elements. In the example of FIG. 16, four combinations are stored, namely, a combination of "an event name 811p and a notification cycle 812p" to a combination of "an event name 811s and a notification cycle 812s". It is to be noted that the terminal end of the event list 800 is recognizable by an element signifying the number of elements or a termination, which is omitted in FIG. 16.

Next, description is given of operations of the GUI apparatus 100c and the service apparatus 300c with reference to FIGS. 15, 16, 17, 18, 19, and 20.

Figure 17:
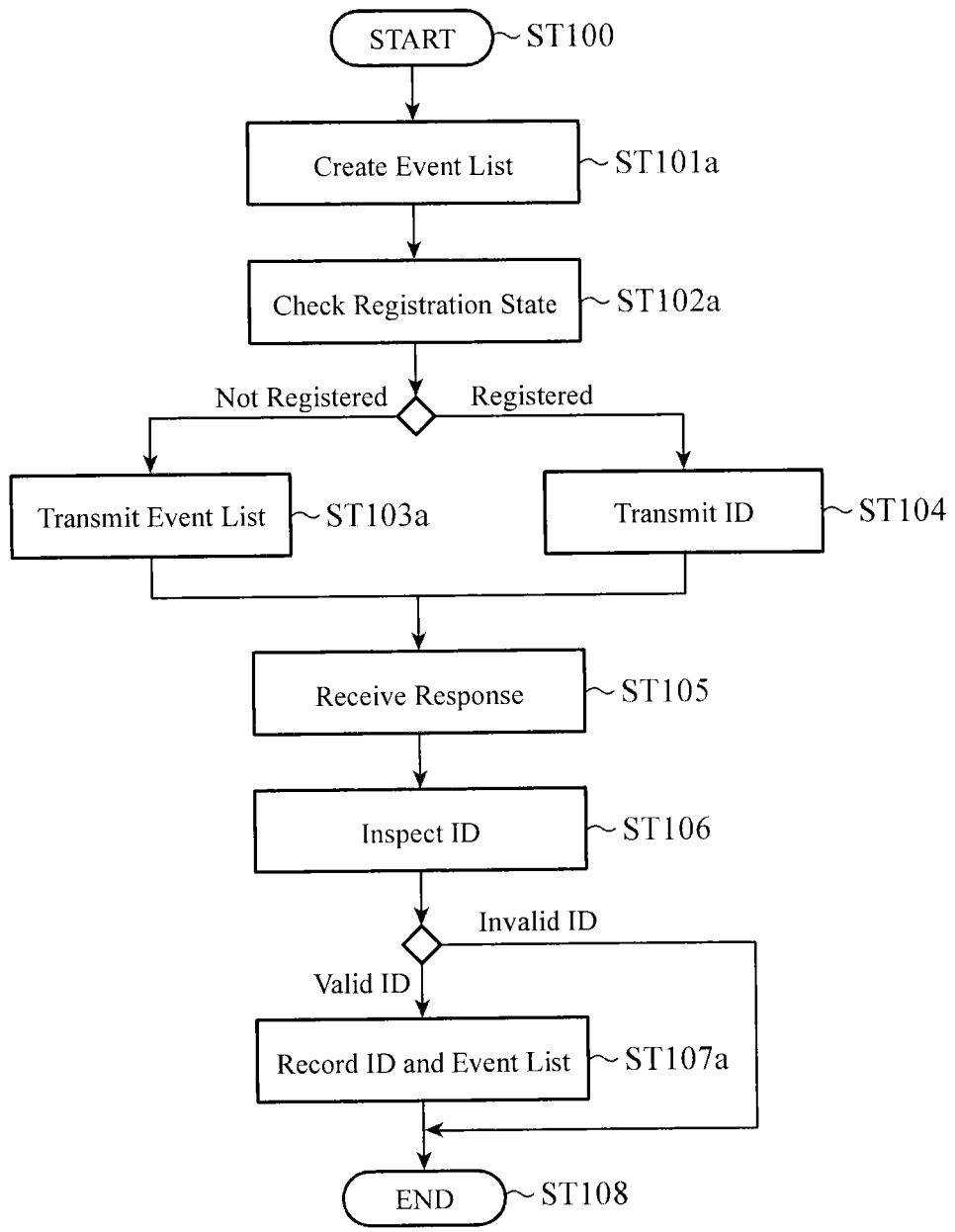
FIG. 17 is a flowchart depicting an operation of a GUI apparatus at the time of registration of an event list in the communication system according to the Embodiment 4 of the present invention.

FIG. 17 is a flowchart depicting an operation of the GUI apparatus 100c at the time of registration of an event list according to this embodiment.

In Steps ST 100, ST 104, ST 105, ST 106, and ST 108, the operation of the event processor 105 of the Embodiment 1 is not different from the operation of the event processor 105c of the Embodiment 4 except that the event list 400 is changed to the event list 800, and that the communication is performed with the service apparatus 300c and not the service apparatus 300. Thus, description of the steps similar to those of the Embodiment 1 is omitted here.

Step ST 101a: The GUI logic processor 102c provides the event processor 105c with an event to be used in the post-transition screen and the notification cycle. The event processor 105c generates an event list 800 by using a combination of zero or more events and the notification cycle(s) that are provided from the GUI logic processor 102c, and temporarily stores the generated event list.

Step ST 102a: The event processor 105c conducts search as to whether an element matching the event list 800 is registered with the event list memory 106 by using the event list 800 temporarily stored at Step ST 101a. As a result, in the case of "not registered," the process proceeds to Step ST 103a. In the case of "registered," the ID stored in the pertinent element is obtained, and the process proceeds to Step ST 104.

Step ST 103a: The event processor 105c transmits the event list 800 through the communicator 104 to the service apparatus 300c.

Step ST 107a: The event processor 105c registers with the event list memory 106 a combination of the ID received in Step ST 105 and the event list 800 temporarily stored at Step ST 101a.

Figure 18:
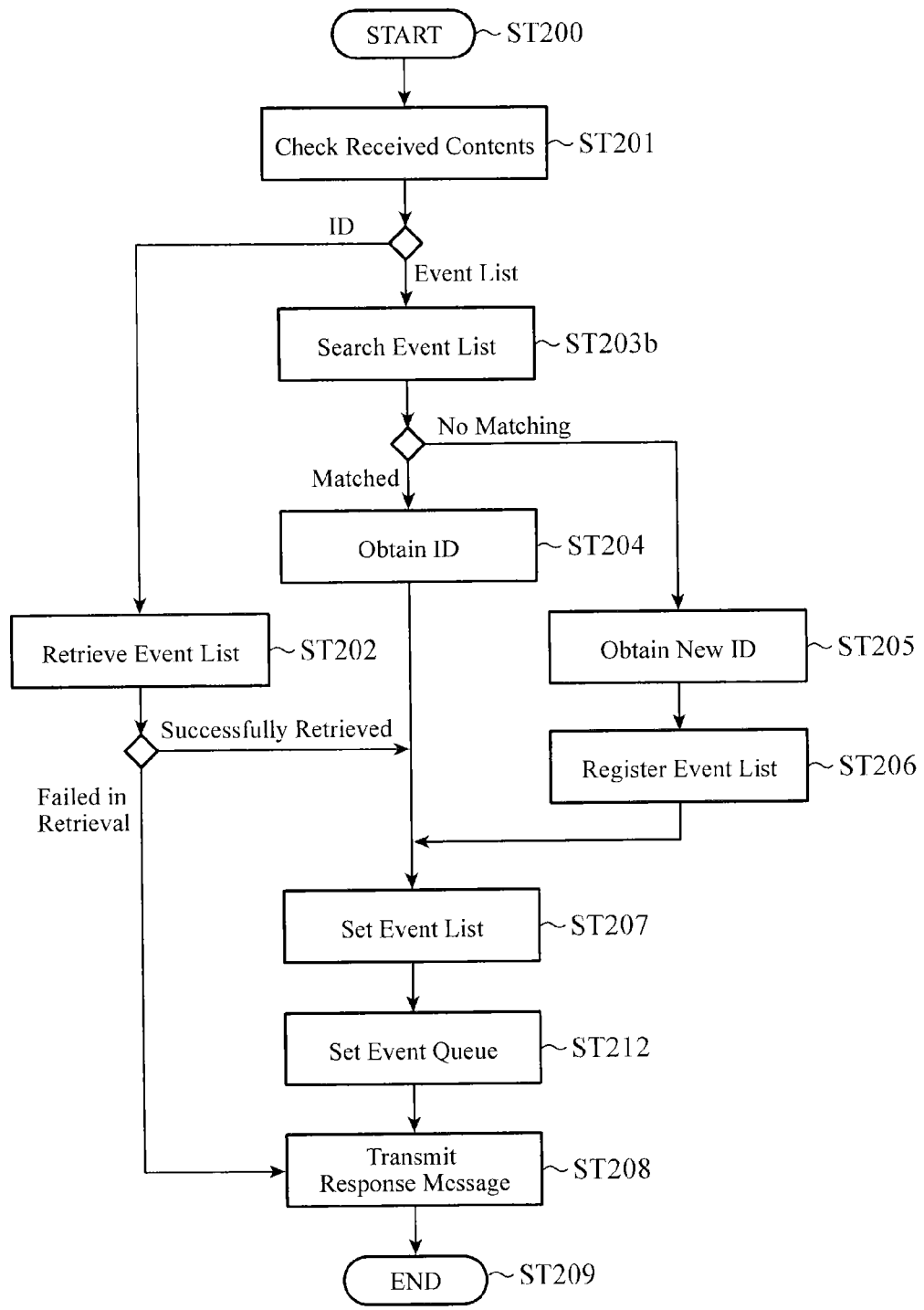
FIG. 18 is a flowchart depicting an operation of the service apparatus at the time of registration of an event list in the communication system according to the Embodiment 4 of the present invention.

FIG. 18 is a flowchart depicting an operation of the service apparatus 300c at the time of registration of an event list according to this embodiment.

In Steps ST 200, ST 201, ST 202, ST 204, ST 205, ST 206, ST 207, ST 208, and ST 209, the operation of the event processor 306 of the Embodiment 1 is not different from the operation of the event processor 306c of the Embodiment 4 except that the communication is performed with the GUI apparatus 100c and not the GUI apparatus 100. Thus, description of these steps is omitted here.

Step ST 203b: The event processor 306c refers to the event list memory 308 by using the event list stored at Step ST 201 to check whether a matching element exists. In the case where the element exists, decision of "matched" is made, and the process proceeds to Step ST 204. In the case where the element does not exist, decision of "no matching" is made, and the process proceeds to Step ST 205. The difference from Step ST 203 of the Embodiment 1 is that, notification cycles are also used for matching determination on event lists.

Step ST 212: The event processor 306c entirely clears event queues that exist in the event accumulator 309. Notification cycles are settable in the event queues (to be described later with reference to FIG. 20) and this setting is also cleared. The event processor 306c refers to the notification cycles of the elements of the event list to check whether an event queue relating to the cycles exists in the event accumulator 309. In the case where no queue exists, the event processor 306c generates an event queue in the event accumulator 309 or sets a notification cycle in an event queue in which a notification cycle has not been set. It is to be noted that in the case where the cycle is 0 ms, accumulation to event queues is not performed, and thus an event queue is not generated. Finally, the event processor 306c prepares and starts a timer that ignites per notification cycle, i.e., that generates a trigger for notification per notification cycle, for each event queue in which a notification cycle is set.

Figure 19:
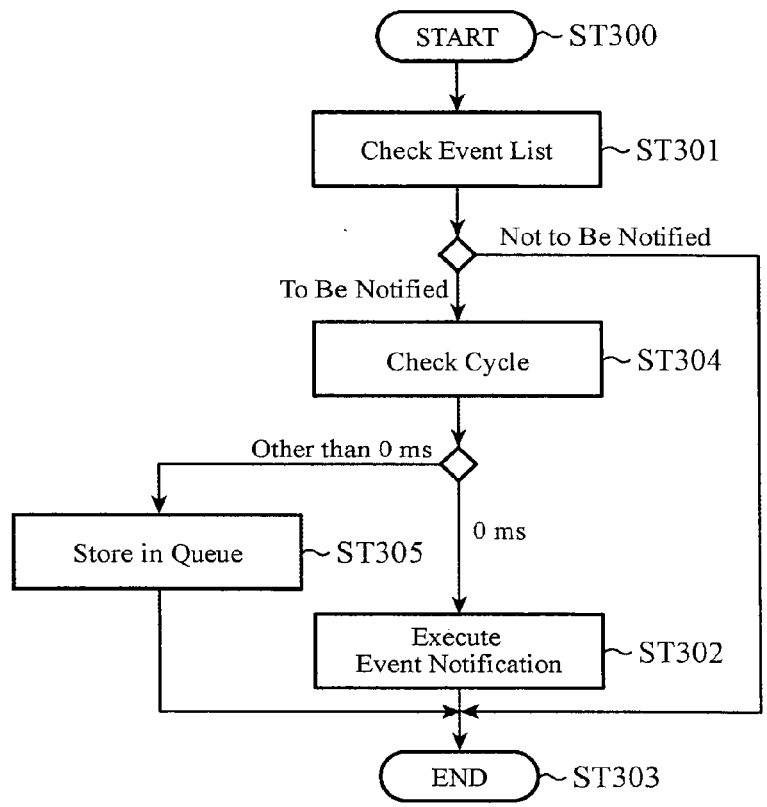
FIG. 19 is a flowchart depicting an operation of the service apparatus at the time of occurrence of an event in the communication system according to the Embodiment 4 of the present invention.

FIG. 19 is a flowchart depicting an operation of the service apparatus 300c at the time of occurrence of an event according to this embodiment.

In Steps ST 300, ST 301, ST 302, and ST 303, the operation of the event processor 306 of the Embodiment 1 is not different from the event processor 306c of the Embodiment 4 except that Step ST 301 is followed by Step ST 304 in the case where decision of "to be notified" is made, and that the communication is performed with the service apparatus 300c and not the service apparatus 300. Thus, description of these steps is omitted here.

Step ST 304: The event processor 306c obtains the notification cycle of an event from the stored event list based on the name of the event given from the service processor 301. In the case where the cycle is 0 ms, the process proceeds to Step ST 302. In the case where the cycle is other than 0 ms, the process proceeds to Step ST 305.

Step ST 305: The event processor 306c uses the cycle obtained in Step ST 304 to identify a pertinent event queue in the event accumulator 309 and stores the event given from the service processor 301.

Figure 20:
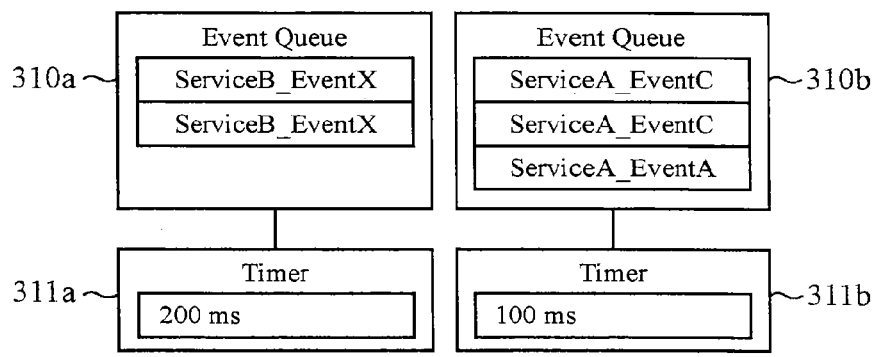
FIG. 20 is an explanatory diagram depicting a relation between an event queue and a timer in the communication system according to the Embodiment 4 of the present invention.

FIG. 20 is an explanatory diagram depicting a relation between the event queue and the timer.

In the illustrated example, two sets of ServiceB_EventX are stored in an event queue 310a, and two sets of Service-A_EventC and one set of ServiceA_EventA are stored in an event queue 310b. In addition, a timer 311a that ignites at 200 ms is associated with the event queue 310a, and a timer 311b that ignites at 100 ms is associated with the event queue 310b.

In a case where any of the timers ignites with the event queues and the timers associated with each other in this manner, the event processor 306c completely takes out events from the event queue corresponding to the timer ignited and notifies the GUI apparatus 100c through the communicator 305. Then, the timer is started by using the cycle set for the event queue. In other words, the timer stops operation once the ignition is ended, and thus a cyclical operation is performed to start the timer again and to take out events from the event queue. In the case where the event queue 310 is empty, notification is not performed. These operations are not illustrated.

In a case where a plurality of events is notified from the service apparatus 300c and such notification including the plurality of events reaches the GUI apparatus 100c, the communicator 104 gives the received contents to the event processor 105c, and the event processor 105c gives the individual events contained in the received contents to the GUI logic processor 102c. These operations are not illustrated.

As has been described, the GUI apparatus 100c of the Embodiment 4 transmits an event list including the notification cycles of events to the service apparatus 300c. The service apparatus 300c provides an event queue based on the notification cycle contained in the received event list to start a timer, accumulates an event in the event queue based on the notification cycles per event at the time of occurrence of the event, and when the timer ignites, collectively notifies the events accumulated in the event queue. The GUI apparatus 100c, upon receipt of a notification having a plurality of events stored therein, gives the events to the GUI logic processor 102c. This allows for reduction in number of notification as compared with the case in which notification is performed at each occurrence of an event.

Figure 21:
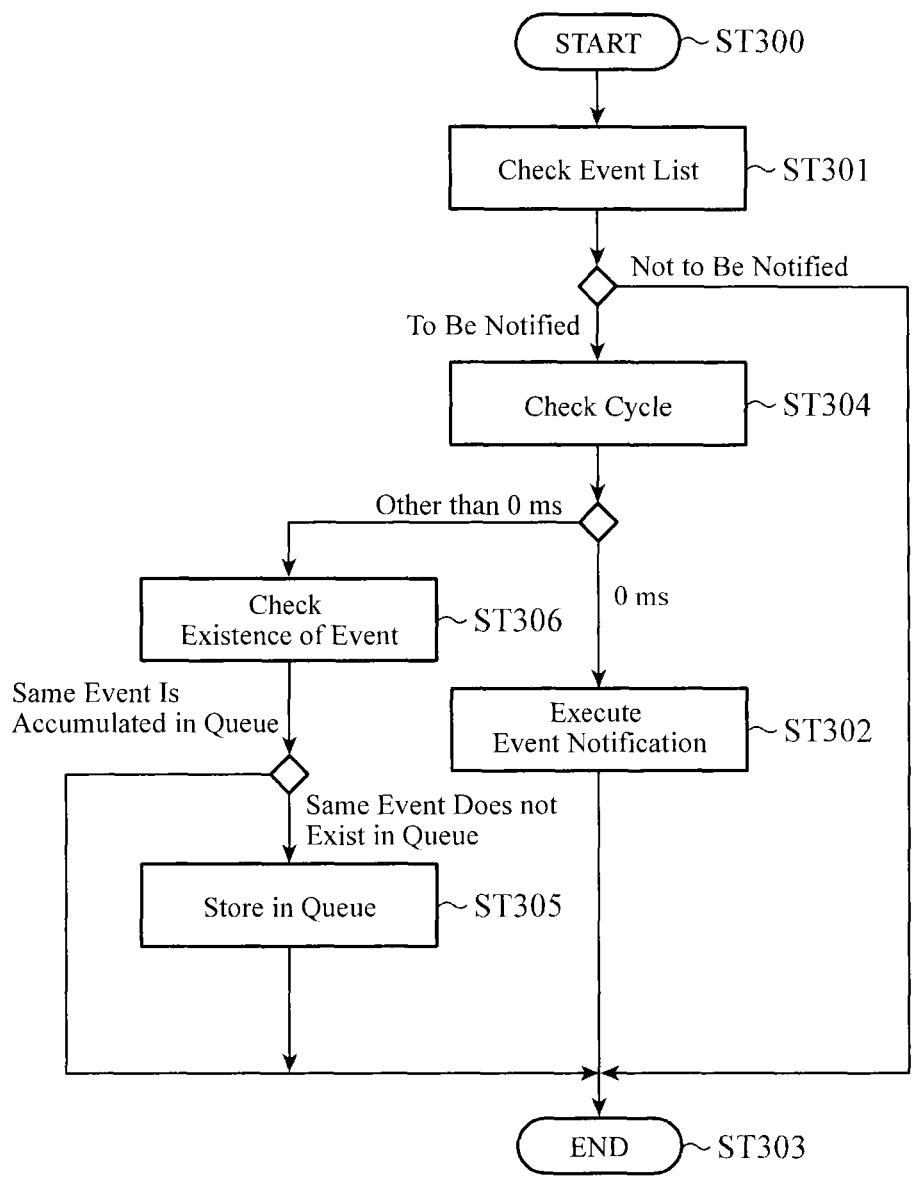
FIG. 21 is a flowchart depicting another operation of the service apparatus at the time of occurrence of an event in the communication system according to the Embodiment 4 of the present invention.

Further, while in the above description, an event is constantly accumulated if the event is to be notified, oftentimes the GUI apparatus need not be notified of a plurality of pieces of the same event. Thus, in a case where event queues to be accumulated are scanned prior to the operation of Step ST 305 and the same event has been accumulated, accumulation of the event may be skipped. This operation is depicted in FIG. 21. Herein, since the steps other than the step of checking whether the event exists in Step ST 306 are the same as those depicted in FIG. 19, description is focused on Step ST 306.

Step ST 306: The event processor 306c checks whether or not the same event is accumulated in an event queue in a case where the cycle is other than 0 ms as a result of the cycle check of Step ST 304. As a result, in the case where the same event is accumulated, the process transits as it is to Step ST 303 for termination. In the case where the same event is not accumulated, the process transits to Step ST 305. This allows for reduction in number of events to be notified by set cycles.

Figure 22:
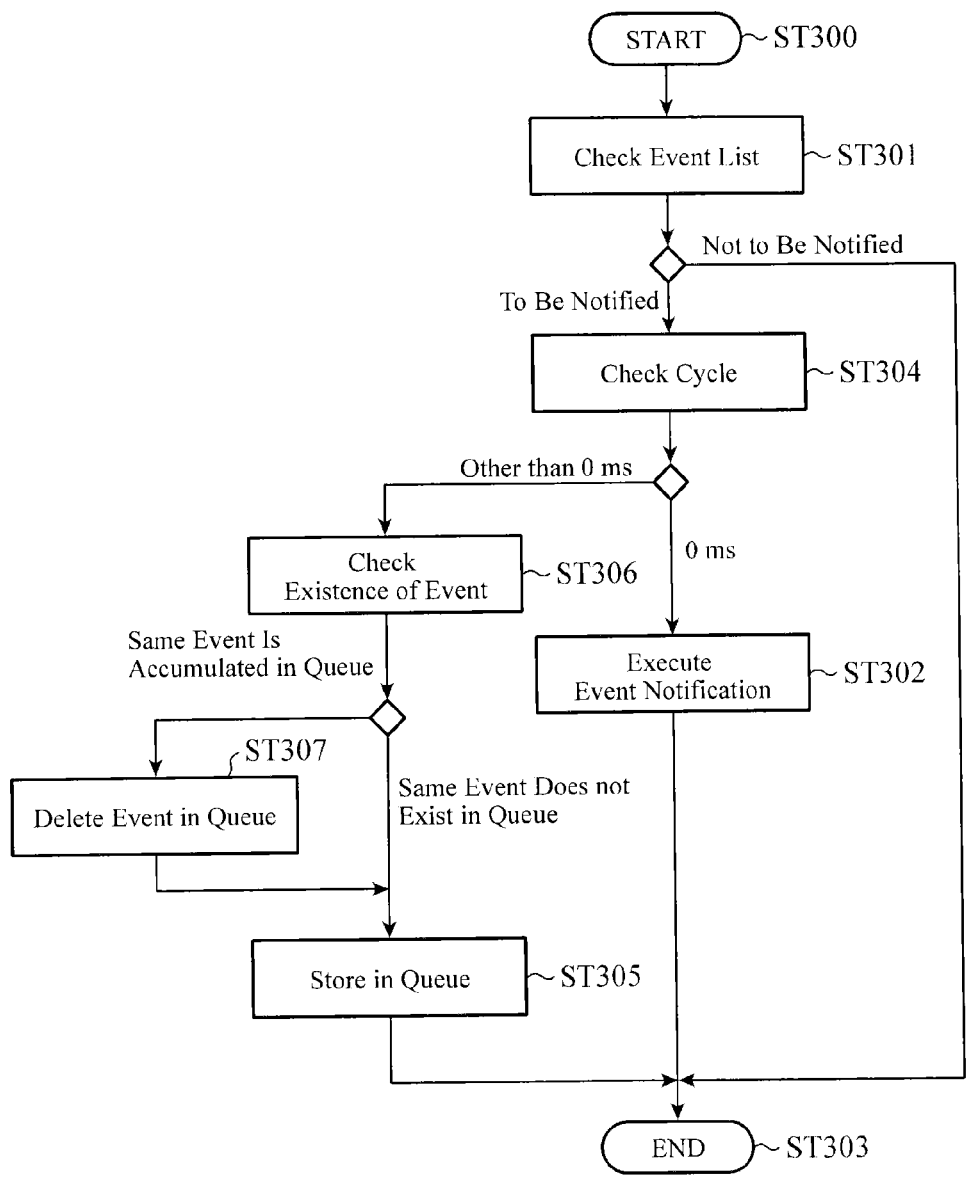
FIG. 22 is a flowchart depicting still another operation of the service apparatus at the time of occurrence of an event in the communication system according to the Embodiment 4 of present the invention.

In the case where the same event is accumulated in an event queue, the accumulated event may be deleted, and the event to be accumulated may be freshly added to the event queue. This operation is depicted in FIG. 22. Herein, since the steps other than the step of deleting the event in Step ST 307 are the same as the steps depicted in FIG. 21, description is focused on Step ST 307.

Step ST 307: The event processor 306c deletes the same event already accumulated in the case where the step of checking the existence of an event in Step ST 306 reveals that the same event has already been accumulated, and the process proceeds to Step ST 305. Such an operation allows for chronological accumulation into event queues based on the time of occurrence of the events.

In the above description, event names are used as information for uniquely identifying the events; additionally, in a case where events have some kind of parameters, such parameters may be used together for decision whether to perform accumulation into event queues. For example, a case where ServiceA_EventA has two parameters of (param_a, param_b) can be assumed.

Here, suppose that an event of ServiceA_Event (2, 200) occurs in a state where an event of ServiceA_Event (1, 200) has been accumulated in an event queue. In Step ST 306 of "checking the existence of an event" in the above-described operations of FIGS. 21 and 22, the values of the parameters are also used to determine the identity of the event. The event processor 306c determines that ServiceA_Event (1, 200) and ServiceA_Event (2, 200) are different events. As a result, ServiceA_Event (2, 200) is stored in the event queue.

It is to be noted that while in the above description, the unit of "ms" is used for the notification cycle 812 of the event list 800, the unit may be omitted in the case where the specifications of description of the event list 800 is clearly defined between the GUI apparatus 100c and the service apparatus 300c. This means that the same effects as those of this embodiment are achieved when numerical values instead of character strings are used for the notification cycle 812.

In the Embodiment 4, additional procedures are described with respect to the GUI apparatus 100 and the service apparatus 300 of the Embodiment 1, however, needless to say, the effects of this embodiment are achieved by adding similar procedures to the GUI apparatus 100a, the GUI apparatus 100b, the service apparatus 300a, and the service apparatus 300b of the Embodiments 2 and 3.

Moreover, in a case where the notification cycle differs while the name of the event is the same in the expression of difference in the Embodiment 3, a type for substitution dedicated to notification cycles may be added to the operation type 711, such that the size of difference is reduced as compared to the case in which the operation type 711 has two kinds of "DEL" and "ADD." For example, this is described with reference to FIG. 16.

In FIG. 16, a cycle 100 ms is set with respect to ServiceA_EventA. Consider the description of difference in the case where the cycle is changed to 200 ms with the event list of FIG. 16 being used in the service processor 301.

In the case where "DEL" and "ADD" are combined, the event differential list will be described as follows:

(1) DEL, ServiceA_EventA
(2) ADD, ServiceA_EventA, 200 ms

Meanwhile, REPLACE is added to the operation type. This is dedicated to rewriting of the notification cycles of event lists. The event differential list may be described as follows:

(1) REPLACE, ServiceA_EventA, 200 ms

As can be seen, the size of difference is smaller when the type dedicated to substitution of notification cycles is used.

As described above, in the communication system of the Embodiment 4, the GUI apparatus-side event processor is configured to add, to each event, information on a notification interval of the service apparatus when transmitting the event list to the service apparatus, wherein the service apparatus further includes an event accumulator that stores an event queue corresponding to the notification interval of each of the events, and wherein, in a case where the event to be generated based on the service of the service processor is the event notified from the GUI apparatus, the service apparatus-side event processor stores the event in the event queue corresponding to the notification interval of the event and, when a notification timing of the event queue comes, notifies the GUI apparatus of the event stored in the event queue. Therefore, the notification cycle is changeable without changing the specifications of the service apparatus. In addition, the number of communication is reduced between the service apparatus and the GUI apparatus.

Further, in the communication system of the Embodiment 4, when storing the event in the event queue, in a case where the same event as one to be stored has already been stored, the service apparatus-side event processor skips storing the event to be stored, or deletes the already stored event and stores the event to be stored. Thus, the number of events to be notified by set cycles is reduced.

Moreover, in the communication system of the Embodiment 4, the service apparatus-side event processor is configured to, in a case where the event has a parameter, make an identify determination as to whether the same event as one having the parameter has already been stored in the event queue. Thus, in a case where the display is changed in the GUI apparatus based on the value of the parameter contained in the event, the events to be used are not discarded on the side of the service apparatus, and the GUI is changeable as intended.

It should be appreciated that the present invention encompasses, within the scope of the invention, free combination of the embodiments or modification of any constituent component of the embodiments, or omission of any constituent components from the embodiments.

As described above, the communication system according to the invention is configured to have a server provided with service logic and a client provided with a GUI, which collaborate with each other through a network. Therefore, the system is suitable for an embedded device having a GUI.

The invention claimed is:

1. A communication system comprising:
   a graphical user interface (GUI) apparatus that performs screen construction based on an event notification; and
   a service apparatus that executes a service and generates an event, the GUI apparatus and the service apparatus being connected with each other through a network to perform mutual communication,
   wherein the GUI apparatus includes:
      a GUI apparatus-side event list memory that stores an event list and an ID corresponding to the event list, the event list being a list of the event; and
      a GUI apparatus-side event processor that refers to the GUI apparatus-side event list memory and, in a case where the event list required for performing the screen construction exists, obtains the ID corresponding to the event list to transmit the obtained ID to the service apparatus in place of the event list.

2. The communication system according to claim 1, wherein the service apparatus includes:
   a service apparatus-side event list memory that stores an event list and an ID corresponding to the event list, the event list being a list of the event; and
   a service apparatus-side event processor that refers to the service apparatus-side event list memory when the ID is received from the GUI apparatus, and, when the event list corresponding to the received ID exists, transmits a response message containing the received ID to the GUI apparatus, and
   wherein, when an valid ID is contained in the response message resulting from the transmission of the ID to the service apparatus, the GUI apparatus-side event processor causing the GUI apparatus-side event list memory to store, as one combination, the ID contained in the response message and the event list transmitted to the service apparatus or the event list whose ID is sent instead.

3. The communication system according to claim 1, wherein the service apparatus includes:
   a service processor that executes the service to generate the event; and
   a service apparatus-side event processor that determines whether or not an event list containing an event occurred by the service of the service processor is a target to be notified to the GUI apparatus, and notifies the GUI apparatus of the event when a result of the determination indicates affirmation.

4. The communication system according to claim 1, wherein the service apparatus includes:
   a service apparatus-side event list memory that stores an event list and an ID corresponding to the event list, the event list being a list of the event;
   an ID manager that manages a relation between the event list and the ID; and
   a service apparatus-side event processor that refers to the service apparatus-side event list memory when the event list is received from the GUI apparatus, and, in a case where the event list matching the received event list exists, obtains the ID corresponding to the existing event list and transmits a response message containing the obtained ID to the GUI apparatus, wherein, in a case where the event list matching the received event list does not exists, the service apparatus-side event processor obtains, from the ID manager, an ID unregistered with the service apparatus-side event list memory and registers with the service apparatus-side event list memory the obtained ID and the received event list as one combination, and transmits a response message containing the obtained ID to the GUI apparatus.

5. The communication system according to claim 4, wherein the service apparatus-side event processor determines, before registering the combination of the event list received from the GUI apparatus and the ID corresponding to the event list with the service apparatus-side event list memory, as to whether a size of the combination exceeds a size of data registrable with the service apparatus-side event list memory, and in a case where the size exceeds, deletes a combination of an event list and an ID having been registered with the service apparatus-side event list memory to be within the size and registers in this state the combination of the event list received from the GUI apparatus and the ID corresponding to the event list with the service apparatus-side event list memory, and includes the ID corresponding to the deleted event list in the response message to the GUI apparatus and transmits the response message, and
   wherein the GUI apparatus-side event processor, in a case where the response message resulting from the transmission of the event list or the ID to the service apparatus contains the ID deleted from the service apparatus-side event list memory, deletes the event list corresponding to the deleted ID from the GUI apparatus-side event list memory.

6. The communication system according to claim 4, wherein, in a case where the ID is contained in the response message resulting from the transmission of the event list or the ID to the service apparatus, the GUI apparatus-side event processor determines as to whether a size registrable with the GUI apparatus-side event list memory is exceeded, and in a case where the size is exceeded, the GUI apparatus-side event processor deletes a combination of an event list and an ID, the combination being registered with the GUI apparatus-side event list memory, to be within the size and registers in this state with the GUI apparatus-side event list memory the ID contained in the response message and the event list transmitted from the GUI apparatus or the event list whose ID is transmitted instead, as one combination.

7. The communication system according to claim 4, wherein, in a case where an event list unregistered with the GUI apparatus-side event list memory is to be transmitted to the service apparatus, the GUI apparatus-side event processor generates a difference between the event list to be transmitted and the event list registered with the GUI apparatus-side event list memory, and in a case where an amount of information indicating the generated difference is smaller than an amount of information of the event list to be transmitted, the GUI apparatus-side event processor transmits to the service apparatus the generated difference and the ID corresponding to the event list registered with the GUI apparatus-side event list memory, the event list being used for creating the difference, in place of the event list to be transmitted, and
   wherein, in a case where the ID and the difference are received from the GUI apparatus, the service apparatus-side event processor obtains the event list from the service apparatus-side event list memory by using the ID, generates a new event list by using the obtained event list and the difference, and processes the newly generated event list in place of the event list received from the GUI apparatus.

8. The communication system according to claim 4, wherein the GUI apparatus-side event processor adds, to each event, information on a notification interval of the service apparatus when transmitting the event list to the service apparatus,
   wherein the service apparatus further includes an event accumulator that stores an event queue corresponding to the notification interval of each of the events, and
   wherein, in a case where the event to be generated based on the service of the service processor is the event notified from the GUI apparatus, the service apparatus-side event processor stores the event in the event queue corresponding to the notification interval of the event and, when a notification timing of the event queue comes, notifies the GUI apparatus of the event stored in the event queue.

9. The communication system according to claim 8, wherein, when storing the event in the event queue, in a case where the same event as one to be stored has already been stored, the service apparatus-side event processor skips storing the event to be stored, or deletes the already stored event and stores the event to be stored.

10. The communication system according to claim 9, wherein, in a case where the event has a parameter, the service apparatus-side event processor makes an identify determination as to whether the same event as one having the parameter has already been stored in the event queue.

11. A graphical user interface (gui) apparatus which is connected through a network with a service apparatus to communicate with each other, and which performs screen construction based on an event notification, the service apparatus executing a service and generating an event, the GUI apparatus comprising:
   a GUI apparatus-side event list memory that stores an event list and an ID corresponding to the event list, the event list being a list of the event; and
   a GUI apparatus-side event processor that transmits to the service apparatus an event list required for performing the screen construction, wherein, before transmitting the event list, the GUI apparatus-side event processor refers to the GUI apparatus-side event list memory, and, in a case where an event list matching the event list to be transmitted exists, obtains an ID corresponding to the existing event list and transmits to the service apparatus the obtained ID instead of the event list to be transmitted.

12. A service apparatus which is connected through a network with a graphical user interface (GUI) apparatus to communicate with each other, and which executes a service and generates an event, the GUI apparatus performing screen construction based on an event notification, the service apparatus comprising:
   a service apparatus-side event list memory that stores an event list and an ID corresponding to the event list, the event list being a list of the event; and
   an ID manager that manages a relation between the event list and the ID; and
   a service apparatus-side event processor that refers to the service apparatus-side event list memory when the event list is received from the GUI apparatus, and, in a case where the event list matching the received event list exists, obtains the ID corresponding to the existing event list and transmits a response message containing the obtained ID to the GUI apparatus, wherein, in a case where the event list matching the received event list does not exists, the service apparatus-side event processor obtains, from the ID manager, an ID unregistered with the service apparatus-side event list memory and registers with the service apparatus-side event list memory the obtained ID and the received event list as one combination, and transmits a response message containing the obtained ID to the GUI apparatus, wherein, when an ID is received from the GUI apparatus, the service apparatus-side event processor refers to the service apparatus-side event list memory, and, when the event list corresponding to the received ID exists, transmits a response message containing the received ID to the GUI apparatus.

* * * * *